US00RE43286E

(19) United States
(12) Reissued Patent
Hu

(10) Patent Number: US RE43,286 E
(45) Date of Reissued Patent: Apr. 3, 2012

(54) RATCHET WHEEL WITH ASYMMETRIC ARCUATE CONCAVE TEETH OR NON-ARCUATE CONCAVE TEETH RATCHETING TOOLS WITH SUCH RATCHET WHEEL AND COMBINATION OF SUCH RATCHET WHEEL AND A PAWL

(76) Inventor: Bobby Hu, Taichung (TW)

(21) Appl. No.: 10/301,491

(22) Filed: Nov. 21, 2002

Related U.S. Patent Documents

Reissue of:
(64) Patent No.: 6,148,695
Issued: Nov. 21, 2000
Appl. No.: 09/365,738
Filed: Aug. 3, 1999

(51) Int. Cl.
*B25B 13/46* (2006.01)
(52) U.S. Cl. ..... 81/60; 81/63.1
(58) Field of Classification Search ..... 81/60–63.2; 192/41 R, 45.1
See application file for complete search history.

(56) References Cited

U.S. PATENT DOCUMENTS

| | | | | |
|---|---|---|---|---|
| 15,482 | A | 8/1856 | Gilman | 81/63 |
| 726,012 | A | 4/1903 | Andrew | |
| 810,599 | A * | 1/1906 | Ansorge | 81/60 |
| 818,761 | A | 4/1906 | Hanes et al. | 81/58.1 |
| 841,686 | A | 1/1907 | Hatfield | |
| 878,657 | A | 2/1908 | Munch | |
| 893,097 | A | 7/1908 | Reams | |
| 915,446 | A | 3/1909 | Kearnes | |
| RE13,205 | E | 2/1911 | Lane | |
| 1,033,358 | A | 7/1912 | Turner | |
| 1,078,059 | A | 11/1913 | Mossberg | |
| 1,090,578 | A | 3/1914 | Smythe | |
| 1,157,427 | A * | 10/1915 | Seivert | 81/60 |
| 1,194,471 | A | 8/1916 | Boosinger | |
| 1,261,092 | A | 4/1918 | Allen | |
| 1,382,492 | A | 6/1921 | Evans | 81/63 |
| 1,426,127 | A | 8/1922 | Tuttle | |
| 1,601,767 | A | 10/1926 | Peterson | 81/58.1 |
| 1,614,039 | A | 1/1927 | Mandl | |
| 1,639,078 | A | 8/1927 | Coe | |

(Continued)

FOREIGN PATENT DOCUMENTS

DE 373436 4/1923

(Continued)

OTHER PUBLICATIONS

Complaint for Declatory Judgment of Noninfringement, Unenforceability, and Invalidity of a Patent, dated Sep. 26, 2002.

(Continued)

*Primary Examiner* — Debra S Meislin
(74) *Attorney, Agent, or Firm* — Alan Kamrath; Kamrath IP Lawfirm, PA

(57) ABSTRACT

A ratchet wheel includes an inner periphery and an outer periphery. The outer periphery includes a number of arcuate concave teeth each having two sides and an intersection of the two sides. The ratchet wheel includes a center, a line from the center to the intersection dividing an angle between the two sides into two unequal portions, thereby forming asymmetric arcuate concave teeth to provide improved structural strength and improved torque. In another embodiment, the concave teeth are non-arcuate to reduce the formation time for the teeth, thereby reducing the production cost.

26 Claims, 26 Drawing Sheets

Amended

U.S. PATENT DOCUMENTS

| | | | | | |
|---|---|---|---|---|---|
| 1,680,515 | A | | 8/1928 | Gormley | |
| 1,733,355 | A | * | 10/1929 | Morse | 81/176.2 |
| 1,772,524 | A | | 8/1930 | Seidemann | 81/58.1 |
| 1,957,462 | A | | 5/1934 | Kress | 81/63 |
| 2,193,984 | A | | 3/1940 | Rhinevault | 192/43.2 |
| 2,201,705 | A | | 5/1940 | Stone | 192/43.2 |
| 2,201,827 | A | | 5/1940 | Froeschl et al. | 192/43.2 |
| 2,317,461 | A | | 4/1943 | Jackson | 81/60 |
| 2,542,241 | A | | 2/1951 | Fors | |
| 2,612,807 | A | | 10/1952 | Hunt | 81/58.1 |
| 2,657,604 | A | | 11/1953 | Rueb | 81/63.2 |
| 2,701,977 | A | | 2/1955 | Stone | |
| 2,735,324 | A | | 2/1956 | Goldwater et al. | 81/60 |
| 2,764,048 | A | | 9/1956 | Thompson | 81/60 X |
| 2,769,360 | A | | 11/1956 | Cottrell et al. | |
| 2,800,821 | A | | 7/1957 | Fruscella | |
| 2,803,980 | A | | 8/1957 | Vogel | 81/62 |
| 2,891,434 | A | | 6/1959 | Lozensky | |
| 2,957,377 | A | | 10/1960 | Hare | |
| 2,978,081 | A | | 4/1961 | Lundin | 192/43.1 |
| 3,019,682 | A | | 2/1962 | Hare | 81/63.2 |
| 3,044,591 | A | | 7/1962 | Kilness | |
| 3,233,481 | A | | 2/1966 | Bacon | |
| 3,250,157 | A | | 5/1966 | Badger | |
| 3,265,171 | A | | 8/1966 | Kilness | 81/63 |
| 3,269,496 | A | | 8/1966 | Kilness | |
| 3,337,014 | A | | 8/1967 | Sandrick | 81/63 |
| 3,342,229 | A | | 9/1967 | Janes | |
| 3,393,587 | A | | 7/1968 | Jolliff et al. | |
| 3,393,780 | A | | 7/1968 | Kilness | 81/63 |
| 3,436,992 | A | | 4/1969 | Over et al. | |
| 3,508,455 | A | | 4/1970 | Miller | 81/58.1 |
| 3,575,069 | A | | 4/1971 | White | 81/58.1 |
| 3,577,816 | A | | 5/1971 | Alexander et al. | |
| 3,598,001 | A | | 8/1971 | Thomasian | 81/63.1 |
| 3,606,940 | A | | 9/1971 | Finkeldei | |
| 3,691,876 | A | | 9/1972 | Cassidy, Jr. | 81/58.1 |
| 3,713,356 | A | | 1/1973 | Knudsen | |
| 3,742,788 | A | | 7/1973 | Priest | |
| 3,783,703 | A | | 1/1974 | Trimble et al. | |
| 3,838,614 | A | * | 10/1974 | O'Donnell | 81/60 |
| 3,866,492 | A | | 2/1975 | Knoll | |
| 3,908,487 | A | | 9/1975 | Plaw | 81/59.1 |
| 3,970,155 | A | | 7/1976 | Otto | |
| 4,053,037 | A | | 10/1977 | Solomon | |
| 4,070,932 | A | | 1/1978 | Jeannotte | 81/177 |
| 4,111,077 | A | | 9/1978 | Cummings et al. | |
| 4,128,025 | A | | 12/1978 | Main et al. | 81/63 |
| 4,147,076 | A | | 4/1979 | Wright et al. | |
| 4,257,507 | A | | 3/1981 | Solomon | |
| 4,274,311 | A | | 6/1981 | Ebert | |
| 4,277,989 | A | | 7/1981 | Tracy | |
| 4,277,990 | A | | 7/1981 | Hall | |
| 4,308,768 | A | | 1/1982 | Wagner | |
| 4,308,769 | A | | 1/1982 | Rantanen | |
| 4,328,720 | A | | 5/1982 | Shiel | |
| 4,336,728 | A | | 6/1982 | Deibert | |
| 4,406,186 | A | | 9/1983 | Gummow | |
| 4,420,995 | A | | 12/1983 | Roberts | |
| 4,485,700 | A | | 12/1984 | Colvin | |
| 4,488,460 | A | | 12/1984 | Ballone et al. | |
| 4,512,218 | A | | 4/1985 | Chow | |
| 4,515,044 | A | * | 5/1985 | Harstad | 81/61 |
| 4,520,697 | A | | 6/1985 | Moetteli | |
| 4,631,988 | A | | 12/1986 | Colvin | |
| 4,631,990 | A | * | 12/1986 | Hughes | 81/62 |
| 4,662,251 | A | | 5/1987 | Kohal | |
| 4,709,600 | A | | 12/1987 | Mierbach et al. | |
| 4,722,252 | A | | 2/1988 | Fulcher et al. | |
| 4,722,253 | A | | 2/1988 | Chow | |
| 4,762,033 | A | | 8/1988 | Chow | |
| 4,770,072 | A | | 9/1988 | Neuhaus | 81/63.2 |
| 4,777,852 | A | | 10/1988 | Herman et al. | |
| 4,796,492 | A | | 1/1989 | Liou | 81/58.4 |
| 4,807,500 | A | | 2/1989 | Main | |
| 4,862,775 | A | | 9/1989 | Chow | 83/63.2 |
| 4,869,138 | A | | 9/1989 | Farris | |
| 4,903,554 | A | | 2/1990 | Colvin | |
| 4,924,737 | A | | 5/1990 | Gummow | |
| 4,934,220 | A | | 6/1990 | Slusar et al. | |
| 4,986,147 | A | | 1/1991 | Cooper | |
| 4,991,468 | A | | 2/1991 | Lee | 81/60 |
| 5,000,066 | A | | 3/1991 | Gentiluomo | 81/62 |
| 5,012,705 | A | | 5/1991 | Chow | |
| 5,038,452 | A | | 8/1991 | Beugelsdyk et al. | 29/436 |
| 5,076,121 | A | | 12/1991 | Fosella | 81/58.4 |
| 5,095,781 | A | | 3/1992 | Blake et al. | 81/58.1 |
| 5,144,869 | A | | 9/1992 | Chow | |
| 5,157,994 | A | | 10/1992 | Krivec | 81/63.2 |
| 5,178,047 | A | | 1/1993 | Arnold et al. | 81/63.2 |
| 5,199,330 | A | | 4/1993 | Arnold et al. | 81/63.2 |
| 5,199,335 | A | | 4/1993 | Arnold et al. | 81/177.8 |
| 5,230,262 | A | | 7/1993 | Ahlund et al. | 81/63.2 |
| 5,231,903 | A | | 8/1993 | Bockman, Jr. | |
| 5,233,891 | A | | 8/1993 | Arnold et al. | 81/63.2 |
| 5,271,300 | A | | 12/1993 | Zurbuchen et al. | |
| 5,295,422 | A | | 3/1994 | Chow | |
| 5,347,892 | A | | 9/1994 | Moetteli | |
| 5,392,672 | A | | 2/1995 | Larson et al. | |
| 5,404,773 | A | | 4/1995 | Norville | |
| 5,425,291 | A | | 6/1995 | Chang | 81/60 |
| 5,448,931 | A | | 9/1995 | Fossella et al. | 81/63.2 |
| 5,467,672 | A | | 11/1995 | Ashby | |
| 5,477,757 | A | | 12/1995 | Maresh | |
| 5,495,783 | A | | 3/1996 | Slusar et al. | |
| 5,499,560 | A | | 3/1996 | Aeschliman | |
| 5,501,124 | A | | 3/1996 | Ashby | |
| 5,509,333 | A | | 4/1996 | Rion | |
| 5,522,288 | A | | 6/1996 | Slusar et al. | |
| 5,533,427 | A | * | 7/1996 | Chow | 81/63.2 |
| 5,535,646 | A | | 7/1996 | Allen et al. | |
| 5,557,994 | A | | 9/1996 | Nakayama | 81/478 |
| 5,582,081 | A | | 12/1996 | Lin | 81/63.1 |
| 5,584,220 | A | | 12/1996 | Darrah et al. | |
| 5,595,095 | A | | 1/1997 | Hillinger | 81/58.3 |
| 5,622,089 | A | | 4/1997 | Gifford, Sr. | 81/62 |
| 5,626,061 | A | | 5/1997 | Whitley | |
| 5,626,062 | A | | 5/1997 | Colvin | 81/63.2 |
| 5,636,557 | A | | 6/1997 | Ma | 81/60 |
| 5,669,875 | A | | 9/1997 | Van Eerdenburg | |
| 5,709,137 | A | | 1/1998 | Blacklock | |
| 5,749,272 | A | | 5/1998 | Phan | 81/62 |
| 5,782,147 | A | | 7/1998 | Chaconas et al. | |
| 5,794,496 | A | | 8/1998 | Arnold | 81/63.2 |
| 5,806,383 | A | * | 9/1998 | Hsieh | 81/170 |
| 5,829,326 | A | | 11/1998 | Richner | |
| 5,842,391 | A | | 12/1998 | Chaconas | |
| 5,857,390 | A | | 1/1999 | Whiteford | 81/62 |
| 5,873,286 | A | | 2/1999 | Van Lenten | |
| 5,878,635 | A | | 3/1999 | Hsieh | 81/63 |
| 5,884,537 | A | | 3/1999 | Chen | |
| 5,884,538 | A | | 3/1999 | Van Lenten | |
| 5,887,493 | A | | 3/1999 | Main | |
| 5,901,620 | A | | 5/1999 | Arnold | 81/63 |
| 5,910,197 | A | | 6/1999 | Chaconas | |
| 5,911,798 | A | | 6/1999 | Arnold | |
| 5,913,954 | A | | 6/1999 | Arnold et al. | |
| 5,927,158 | A | | 7/1999 | Lin | |
| 5,946,987 | A | | 9/1999 | Wei | |
| 5,946,989 | A | | 9/1999 | Hsieh | |
| 5,957,009 | A | | 9/1999 | McCann | 81/63.2 |
| 5,964,129 | A | | 10/1999 | Shiao | |
| 5,970,552 | A | | 10/1999 | Kwiecien et al. | 7/143 |
| 5,979,274 | A | * | 11/1999 | Hsieh | 81/60 |
| 5,996,453 | A | | 12/1999 | Blacklock | |
| 6,000,302 | A | | 12/1999 | Chiang | |
| 6,006,631 | A | | 12/1999 | Miner et al. | |
| 6,044,731 | A | | 4/2000 | Hsieh | |
| 6,065,374 | A | | 5/2000 | Taggart | 81/63.2 |
| 6,125,722 | A | | 10/2000 | Hopper, Jr. et al. | |
| 6,134,990 | A | | 10/2000 | Ling et al. | |
| 6,134,991 | A | | 10/2000 | Chaconas | |
| D433,896 | S | | 11/2000 | Wei | D8/28 |
| D434,292 | S | | 11/2000 | Hsieh | D8/28 |
| 6,152,826 | A | | 11/2000 | Profeta et al. | |
| 6,155,140 | A | | 12/2000 | Tsai | |
| 6,161,454 | A | | 12/2000 | Chaconas | |

| | | | | |
|---|---|---|---|---|
| 6,164,167 | A | 12/2000 | Chen | 81/63.2 |
| 6,205,889 | B1 | 3/2001 | Hsieh | |
| 6,209,423 | B1 | 4/2001 | Shiao | 81/62 |
| 6,216,563 | B1 | 4/2001 | Hsieh | 81/63.2 |
| 6,216,567 | B1 | 4/2001 | Hu | |
| 6,220,123 | B1 | 4/2001 | Chen | |
| 6,230,591 | B1 | 5/2001 | Ling et al. | |
| 6,240,813 | B1 | 6/2001 | Hyatt | |
| 6,257,096 | B1 | 7/2001 | Ling | |
| 6,257,097 | B1 | 7/2001 | I-He | |
| 6,260,448 | B1 | 7/2001 | Chaconas | |
| 6,260,449 | B1 | 7/2001 | I-He | |
| 6,263,767 | B1 | 7/2001 | Hu | |
| 6,282,991 | B1 | 9/2001 | Hu | |
| 6,282,992 | B1 | 9/2001 | Hu | 81/63.2 |
| 6,282,993 | B1 | 9/2001 | Forman et al. | |
| 6,301,998 | B1 | 10/2001 | Hu | 81/60 |
| 6,308,594 | B1 | 10/2001 | Cheng | 81/62 |
| 6,332,382 | B1 | 12/2001 | Anderson et al. | 81/438 |
| 6,334,373 | B1 | 1/2002 | Hsieh | 81/60 |
| 6,382,051 | B1 | 5/2002 | Chang | 81/60 |
| 6,382,052 | B1 | 5/2002 | Chen | 81/63 |
| 6,386,072 | B1 | 5/2002 | Yuan-Chin et al. | 81/63.2 |
| 6,427,560 | B1 | 8/2002 | Shea | 81/58.1 |
| 6,431,031 | B1 | 8/2002 | Hu | 81/63.2 |
| 6,435,062 | B1 | 8/2002 | McCann | 81/63 |
| 6,435,063 | B1 | 8/2002 | Chen | 81/63.2 |
| 6,450,066 | B1 | 9/2002 | Hu | 81/60 |
| 6,450,068 | B1 | 9/2002 | Hu | 81/63.2 |
| 6,453,779 | B2 | 9/2002 | Hu | 81/63 |
| 6,457,387 | B1 | 10/2002 | Hu | 81/63.2 |
| 6,457,388 | B1 | 10/2002 | Chen | 81/63.2 |
| 6,457,389 | B1 | 10/2002 | Hu | 81/63.2 |
| 6,488,136 | B2 * | 12/2002 | Chang | 192/46 |
| 6,516,691 | B1 | 2/2003 | Wei | 81/63.2 |
| 6,520,051 | B1 | 2/2003 | Hu | 81/60 |
| 6,539,825 | B1 | 4/2003 | Lin | 81/60 |
| 6,568,299 | B2 | 5/2003 | Hu | 81/63.2 |
| 6,591,717 | B2 | 7/2003 | Wei | 81/60 |
| 6,629,477 | B2 | 10/2003 | Ling et al. | 81/63.2 |
| 6,644,148 | B2 | 11/2003 | Hu | 81/63.2 |
| 6,647,832 | B2 | 11/2003 | Hu | 81/63.2 |
| 6,662,693 | B2 | 12/2003 | Hu | |
| 6,666,112 | B2 | 12/2003 | Hu | 81/63.2 |
| 6,666,117 | B2 | 12/2003 | Hu | 81/467 |
| 6,688,195 | B1 | 2/2004 | Hsien | 81/60 |
| 6,708,586 | B1 | 3/2004 | Chen | 81/63.2 |
| 6,722,234 | B2 | 4/2004 | Hu | 81/63.2 |
| 6,732,614 | B2 | 5/2004 | Hu | 81/63.2 |
| 6,745,647 | B2 | 6/2004 | Wang | |
| 6,748,825 | B2 | 6/2004 | Hsu | 81/60 |
| 6,758,641 | B2 | 7/2004 | Hu | 409/132 |
| 6,761,092 | B2 | 7/2004 | Hsien | 81/63.2 |
| 2002/0023520 | A1 | 2/2002 | Hu | |
| 2002/0162423 | A1 | 11/2002 | Hu | 81/60 |
| 2002/0162424 | A1 | 11/2002 | Hu | |
| 2002/0166417 | A1 | 11/2002 | Hu | 81/63.2 |
| 2002/0166418 | A1 | 11/2002 | Hsieh | 81/125 |
| 2002/0194950 | A1 | 12/2002 | Hu | |
| 2003/0010159 | A1 | 1/2003 | Hu | |
| 2003/0070512 | A1 | 4/2003 | Hu | 81/63.2 |
| 2003/0121373 | A1 | 7/2003 | Ling et al. | 81/63.2 |
| 2003/0154826 | A1 | 8/2003 | Lee | 81/63.1 |
| 2003/0196522 | A1 | 10/2003 | Hu | 81/63.2 |
| 2004/0093995 | A1 | 5/2004 | Hu | 81/63.2 |

FOREIGN PATENT DOCUMENTS

| | | |
|---|---|---|
| DE | 921198 | 7/1949 |
| DE | 1810811 | 6/1970 |
| DE | 9907467 | 9/1999 |
| DE | 9910932 | 9/1999 |
| FR | 498276 | 1/1920 |
| GB | 1559093 | 1/1980 |
| GB | 2135226 | 8/1984 |
| TW | 130638 | 2/1977 |
| TW | 212343 | 5/1982 |
| TW | 310649 | 1/1986 |

OTHER PUBLICATIONS

Amended Complaint for Declatory Judgment of Noninfringement, Unenforceability, and Invalidity of a Patent, dated Sep. 19, 2003.

Plaintiff's Second Supplemental Response to Interrogatory No. 3 of Defendant's First Set of Interrogatories, dated Apr. 21, 2004.

Tool and Manufacturing Engineers Handbook, 1976, 3rd Edition, pp. 6-48.

EPO Search Report for Appln. No. EP 00 12 6902 dated Feb. 17, 2003 (3p.) 0570.

* cited by examiner

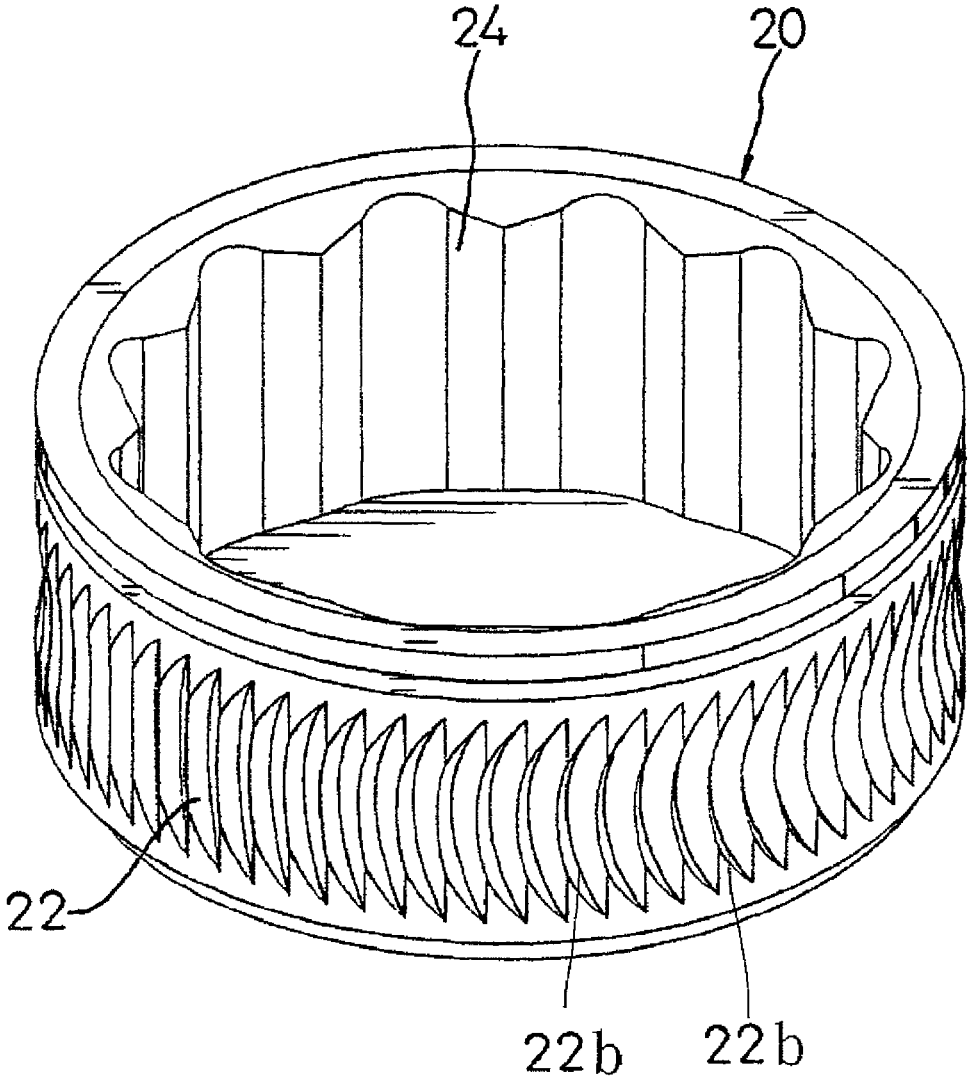
Fig. 1
Amended

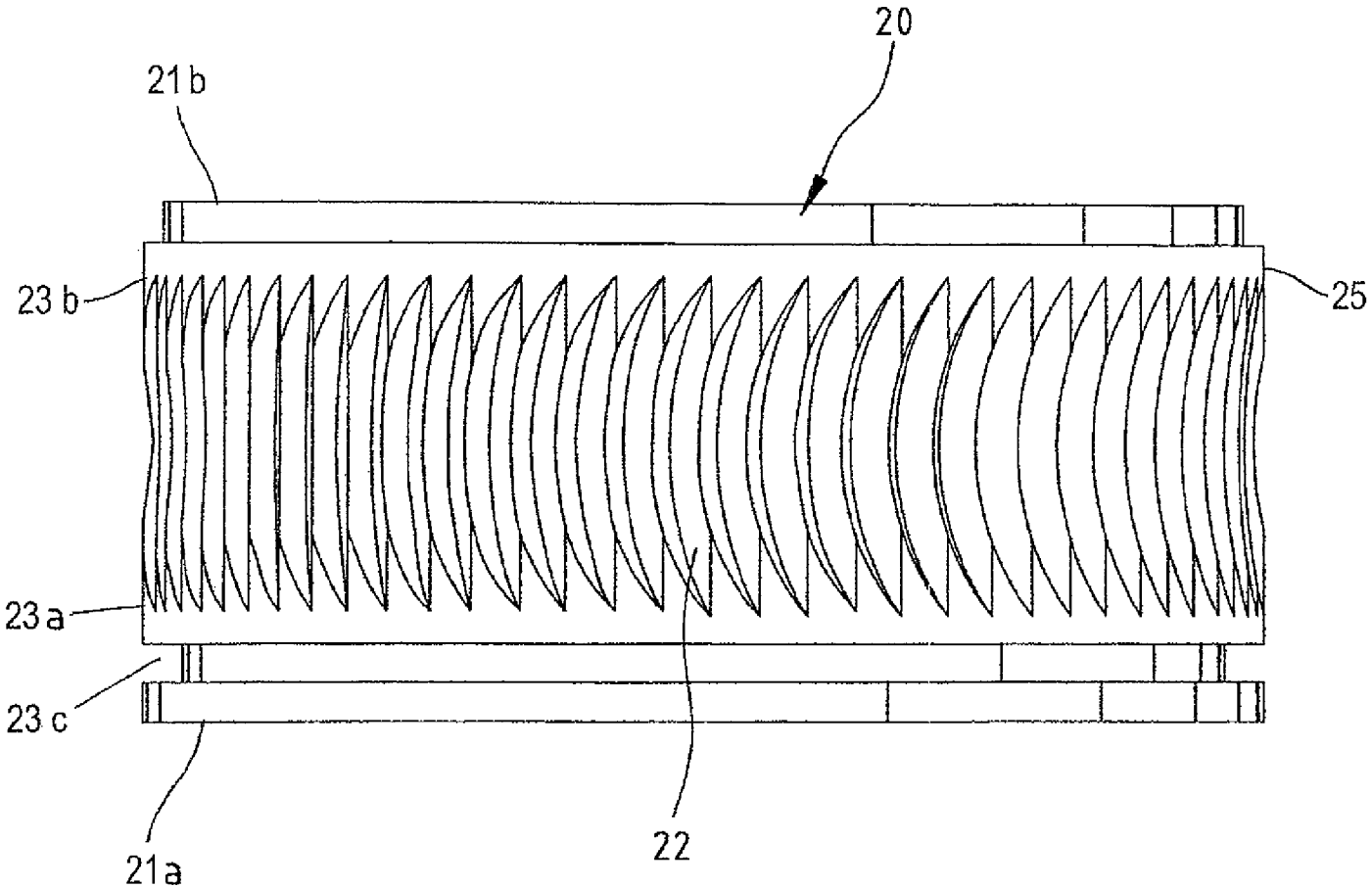
Fig. 2
Amended

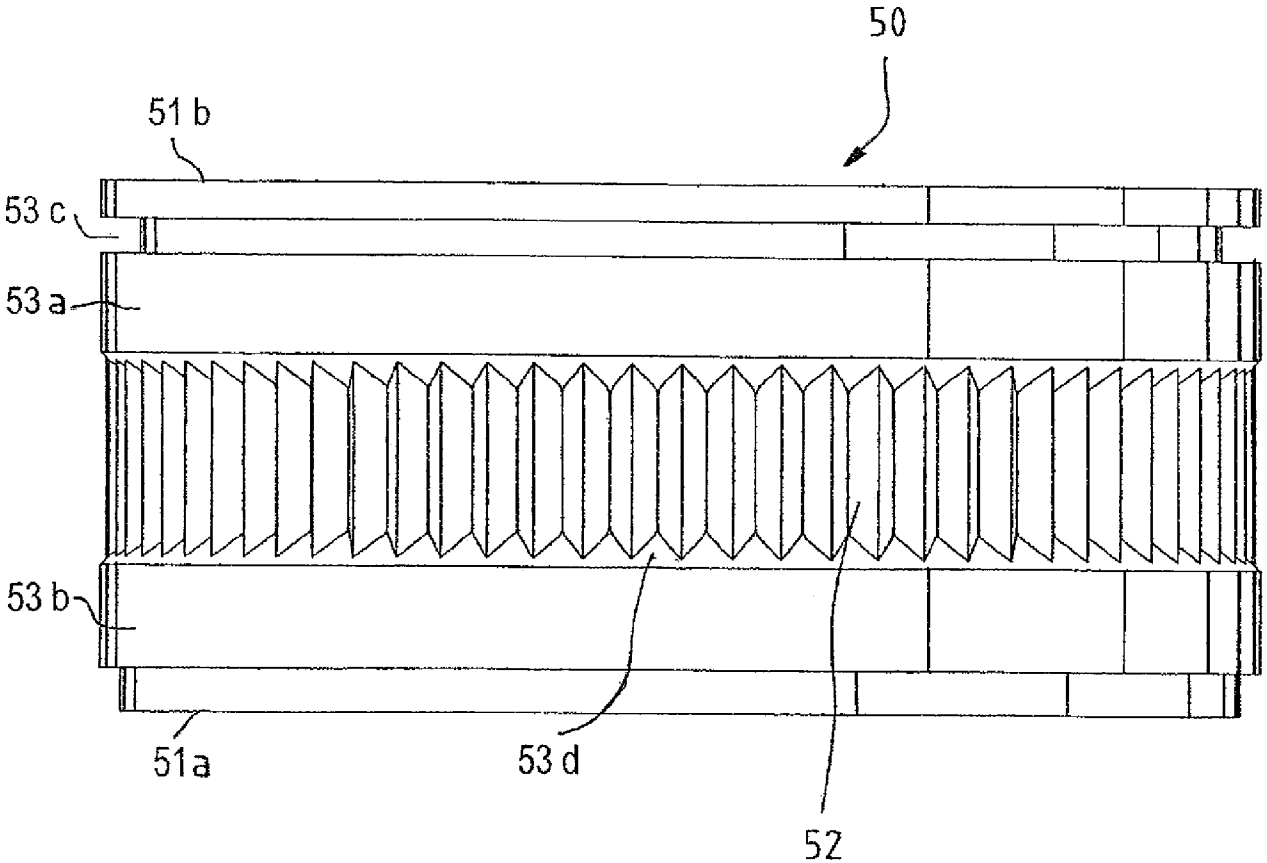
Fig. 22
Amended

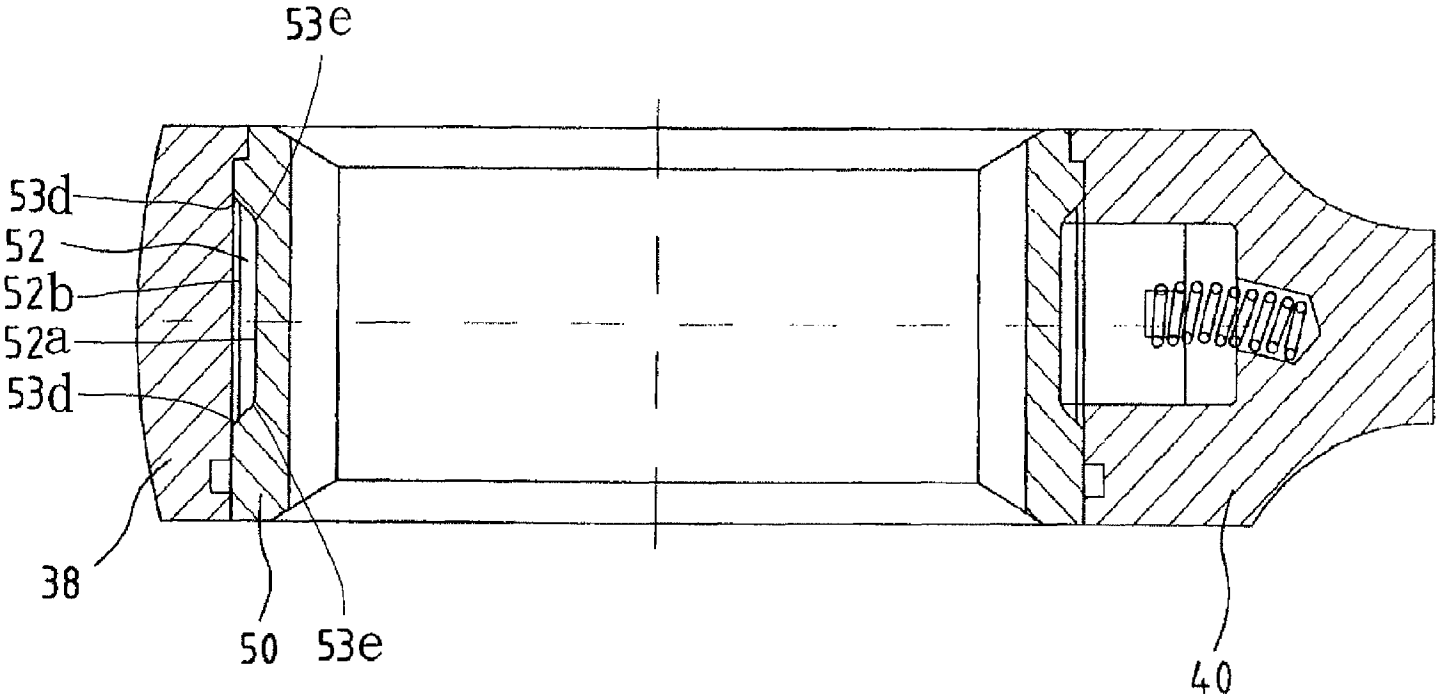
Fig. 24
Amended

RATCHET WHEEL WITH ASYMMETRIC ARCUATE CONCAVE TEETH OR NON-ARCUATE CONCAVE TEETH RATCHETING TOOLS WITH SUCH RATCHET WHEEL AND COMBINATION OF SUCH RATCHET WHEEL AND A PAWL

Matter enclosed in heavy brackets [ ] appears in the original patent but forms no part of this reissue specification; matter printed in italics indicates the additions made by reissue.

*REFERENCE TO RELATED APPLICATIONS*

*This application is a reissue application of U.S. Pat. No. 6,148,695, issued Nov. 21, 2000, and filed on Aug. 3, 1999, with application Ser. No. 09/365,738.*

BACKGROUND OF THE INVENTION

1. Field of the Invention

The present invention relates to a ratchet wheel with asymmetric arcuate concave teeth or non-arcuate concave teeth. The present invention also relates to a ratcheting tool, e.g., a ring spanner having a box end in which the ratchet wheel is mounted. The ratchet wheel with asymmetric arcuate concave teeth provides improved structural strength and improved torque. The ratchet wheel with non-arcuate concave teeth is easy to form and thus reduces the production cost.

2. Description of the Related Art

A wide variety of spanners and wrenches have heretofore been provided. Ring spanners are the best choice for driving fasteners (e.g., nuts, bolt heads, [etc] *etc.*) in a limited space that is [uneasy] *not easy* to access and *where it is* difficult to operate all kinds of ratcheting tools. Nevertheless, conventional ring spanners have low driving torque. Ratchet type ring spanners have been proposed to solve this problem. A ratchet wheel is mounted in the box end of a ring spanner for driving fasteners at high torque. It is, however, found that, the structural strength of the ratchet wheel is weak, as an outer periphery of the ratchet wheel is processed to form a plurality of arcuate *concave* teeth with a considerable depth.

FIGS. 11 through 13 of the drawings illustrate a conventional ratchet wheel 1 mounted in a box end (not shown) of a ring spanner (not shown) and having an inner periphery 4 for driving a fastener (not shown) and an outer periphery having a plurality of arcuate concave teeth 3. Referring to FIG. 12, each arcuate concave tooth 3 is formed by means of feeding a cutter 2 along a direction transverse to a radial direction (see line OR). The resultant concave tooth 3 has a depth "d" and two sides that intersect at point "R". The line OR divides the angle a defined by the two sides of the arcuate concave tooth 3 into two equal portions (usually 45° for each portion). As illustrated in FIG. 12, each arcuate concave tooth 3 is machined to have a considerable depth "d" that adversely affects the structural strength of the ratchet wheel 1, as the remaining wall thickness "t" of the ratchet wheel 1 is relatively small. As a result, the driving torque provided by the ratchet wheel for driving the fastener is limited.

FIGS. 14 through 16 of the drawings illustrate a conventional ratchet wheel 5 mounted in a box end 9a (FIG. 17) of a ring spanner 9 (FIG. 17) and having an inner periphery 8 for driving a fastener (not shown) and an outer periphery having a plurality of arcuate concave teeth 6. Referring to FIG. 15, each arcuate concave tooth 6 is formed by means of feeding a cutter 7 along a radial direction. The resultant arcuate concave tooth 6 has a depth "d" and two sides that intersect at point "R". The line OR divides the angle β defined by the two sides of the concave tooth 6 into two equal portions (usually 45° for each portion). As illustrated in FIG. 15, each arcuate concave tooth 6 is machined to have a considerable depth "d" that adversely affects the structural strength of the ratchet wheel, as the remaining wall thickness "t" of the ratchet wheel 5 is relatively small. As a result, the driving torque provided by the ratchet wheel for driving the fastener is limited. Such structure has been disclosed in U.S. Pat. No. 5,533,427 to Chow issued on Jul. 9, 1996, which is incorporated herein for reference. A further drawback of this conventional ratchet wheel is the low production rate for forming the arcuate concave teeth by cutting.

The present invention is intended to provide an improved ratchet wheel that mitigates and/or obviates the above problems.

SUMMARY OF THE INVENTION

It is a primary object of the present invention to provide an improved ratchet wheel [has] *having* asymmetric arcuate concave teeth for providing improved structural strength and improved torque.

It is another object of the present invention to provide an improved ratchet wheel that has non-arcuate concave teeth to allow higher production [rate] *rates*, as the non-arcuate concave teeth can be formed by means of roll squeezing method, investment casting, or molding. The non-arcuate concave teeth may be symmetric or asymmetric. The ratchet wheel with non-arcuate concave teeth may bear higher torque during ratcheting (i.e., tightening or loosening a fastener).

The present invention also provides a ratcheting tool, e.g., a spanner, equipped with a ratchet wheel in accordance with the present invention. In an embodiment of the invention, the spanner has a box end for receiving a ratcheting wheel with asymmetric arcuate concave teeth. In another embodiment of the invention, the spanner has a box end for receiving a ratcheting wheel with non-arcuate asymmetric concave teeth. In a further embodiment of the invention, the spanner has a box end for receiving a ratcheting wheel with non-arcuate symmetric concave teeth.

Other objects, advantages, and novel features of the invention will become more apparent from the following detailed description when taken in conjunction with the accompanying drawings.

BRIEF DESCRIPTION OF THE DRAWINGS

FIG. 1 is a perspective view of a ratchet wheel with asymmetric arcuate concave teeth in accordance with the present invention;

FIG. 2 is a side view of the ratchet wheel in accordance with the present invention;

FIG. 7b is a top view of the pawl in FIG. 7a;

FIG. 7c is a side view of the pawl in FIG. 7a;

FIG. 8b is a top view of the pawl in FIG. 8a;

FIG. 8c is a side view of the pawl in FIG. 8a;

FIG. 22 is a side view of the ratchet wheel in FIG. 21;

FIG. 24 is a sectional view taken along line 24-24 in FIG. 23;

FIG. 26b is a lop view of the pawl in FIG. 26a; and

FIG. 26c is a side view of the pawl in FIG. 26a.

DETAILED DESCRIPTION OF THE PREFERRED EMBODIMENTS

Figure 3:
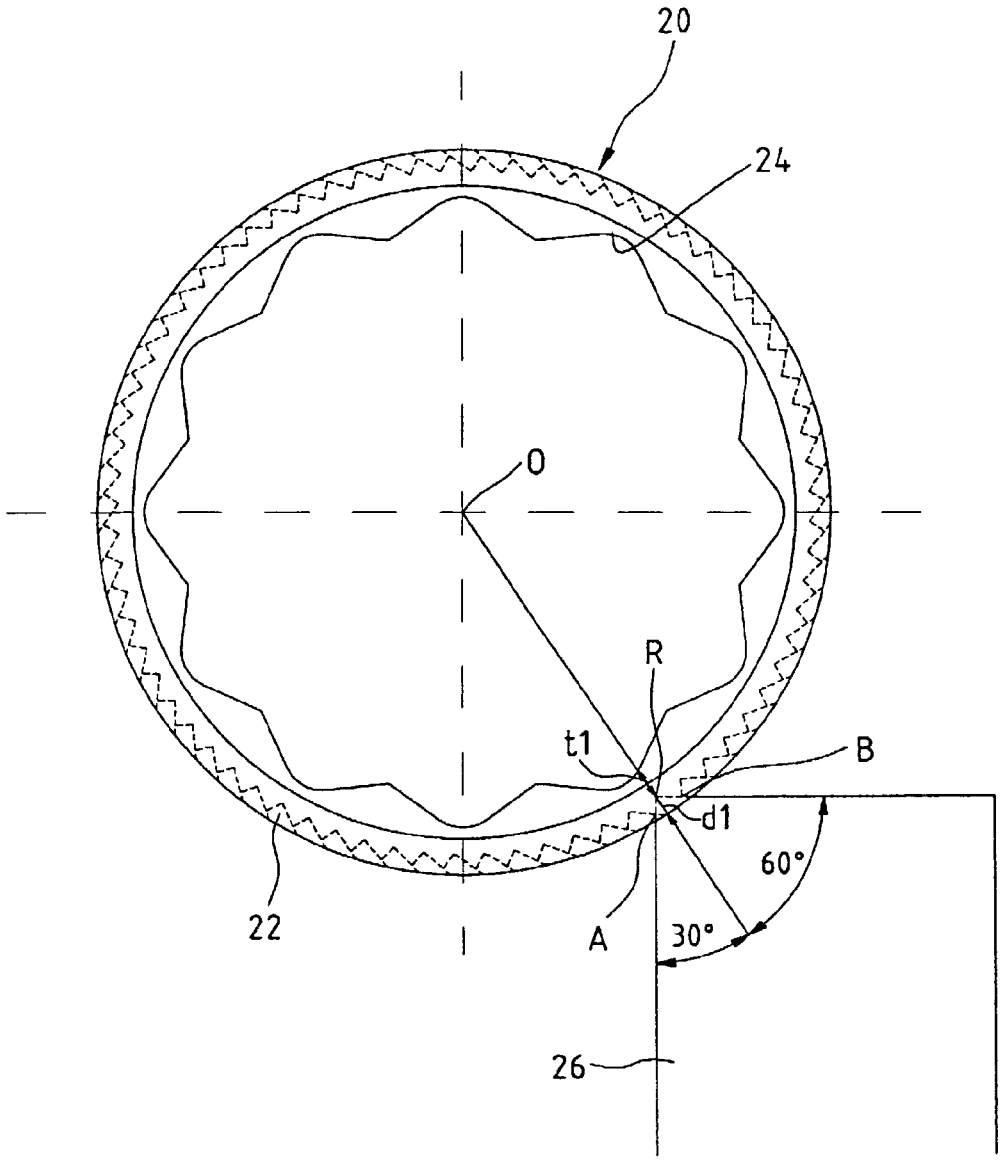
FIG. 3 is a top view of the ratchet wheel in accordance with the present invention, illustrating formation of asymmetric arcuate concave teeth in an outer periphery of the ratchet wheel.

Referring to FIGS. 1 through 9 and initially to FIGS. 1 through 3, a ratchet wheel 20 in accordance with the present invention generally includes *first and second axial ends 21a and 21b,* an inner periphery 24 for driving a fastener (not shown) and an outer periphery having a plurality of arcuate concave teeth 22. *The plurality of concave teeth 22 have an axial extent less than that between the axial ends 21a and 21b. The plurality of concave teeth 22 are axially spaced from the axial ends 21a and 21b to define first and second axially spaced portions 23a and 23b. The first axially spaced portion 23a includes a radially extending annular recess. Each arcuate tooth 22 is defined by two sides, with an intersection of radially outer linear edges 22b of teeth 22 being arcuate in shape in a direction parallel to the outer periphery.*

Referring to FIG. 3, each arcuate concave tooth 22 is formed by means of feeding a cutter 26 along a direction transverse to a radial direction (see line OR). The resultant concave tooth 22 has a *radial* depth "$d_1$" and two sides RA and RB that intersect at point "R". The line OR divides the angle θ defined by the two sides RA and RB of the concave tooth 22 into two unequal portions (e.g., 30° and 60°, 40° and 50°, [etc] *etc.*). Namely, every *concave* tooth 22 thus formed is "asymmetric", or the two sides for each [teeth] *concave tooth* 22 is not equal, which is the most important feature of this embodiment of the present invention. As illustrated in FIG. 3, each concave tooth 22 is machined to have a depth "$d_1$" that will not adversely affect the structural strength of the ratchet wheel, as the remaining wall thickness "$t_1$" of the ratchel wheel 20 is still relatively large. As a result, the ratchet wheel 20 may bear a relatively large driving torque for driving the fastener.

Figure 4:
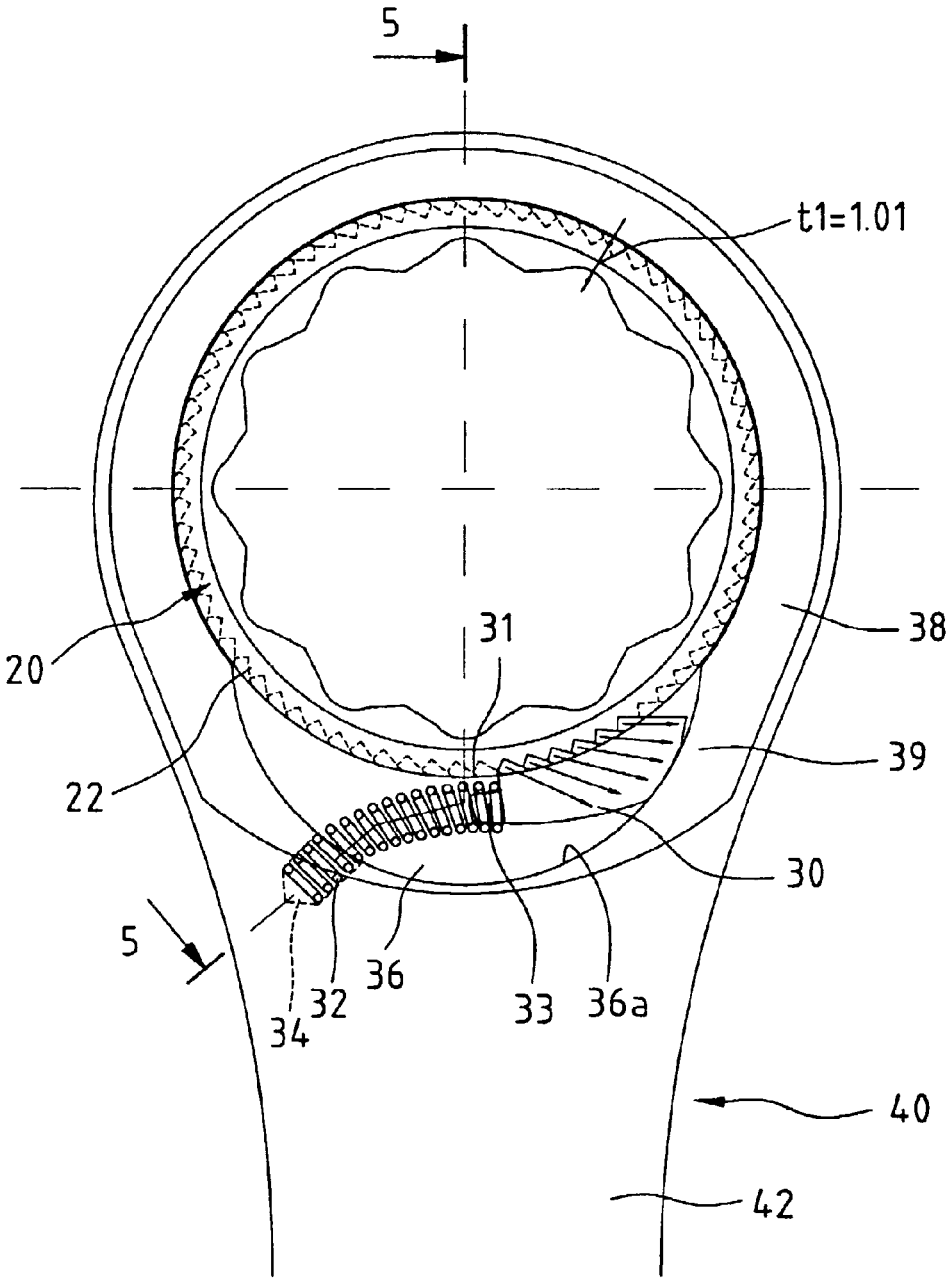
FIG. 4 is a top view of a box end of a ring spanner equipped with the ratchet wheel in accordance with the present invention.
Figure 5:
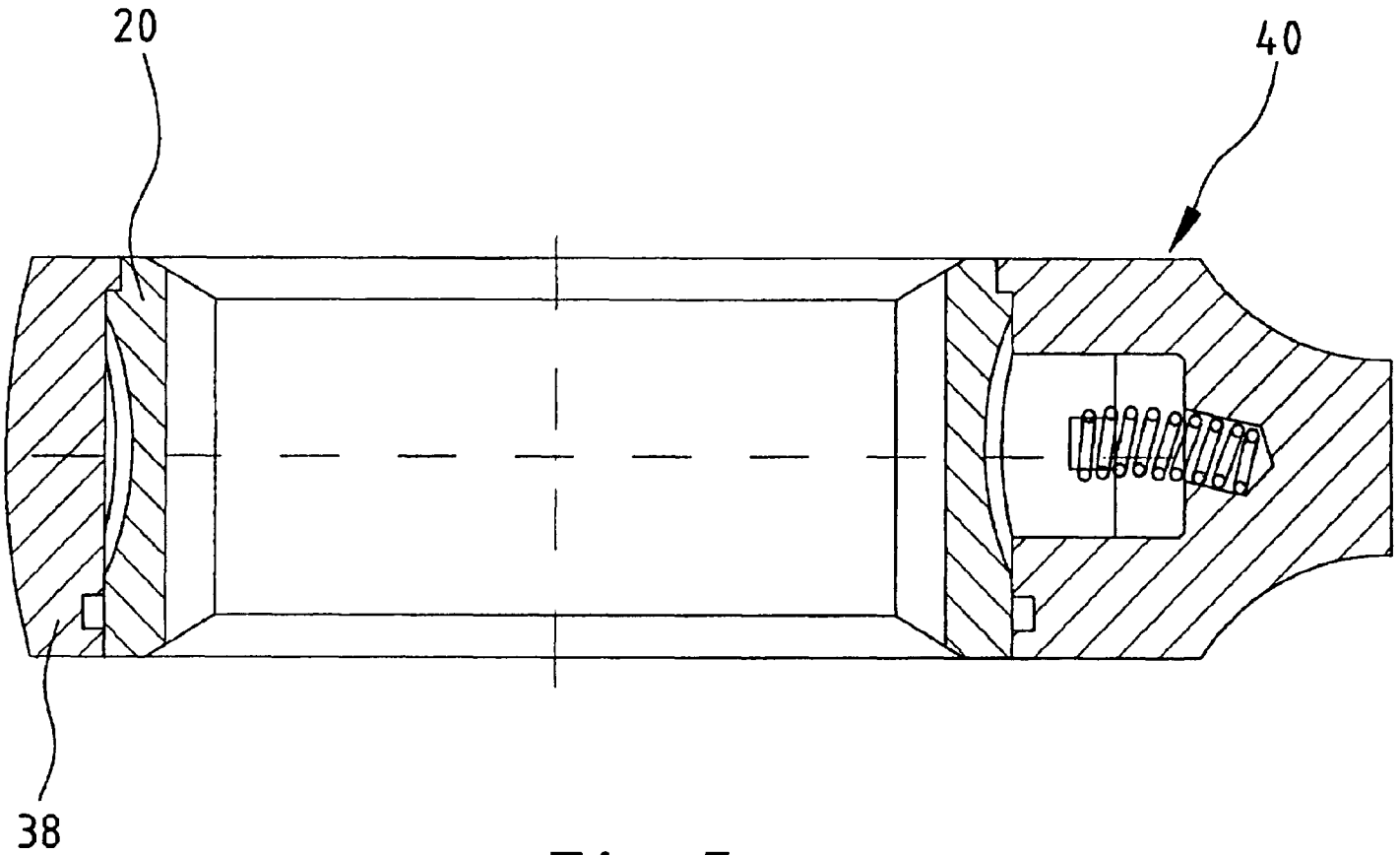
FIG. 5 is a sectional view taken along line 5-5 in FIG. 4.
Figure 6:
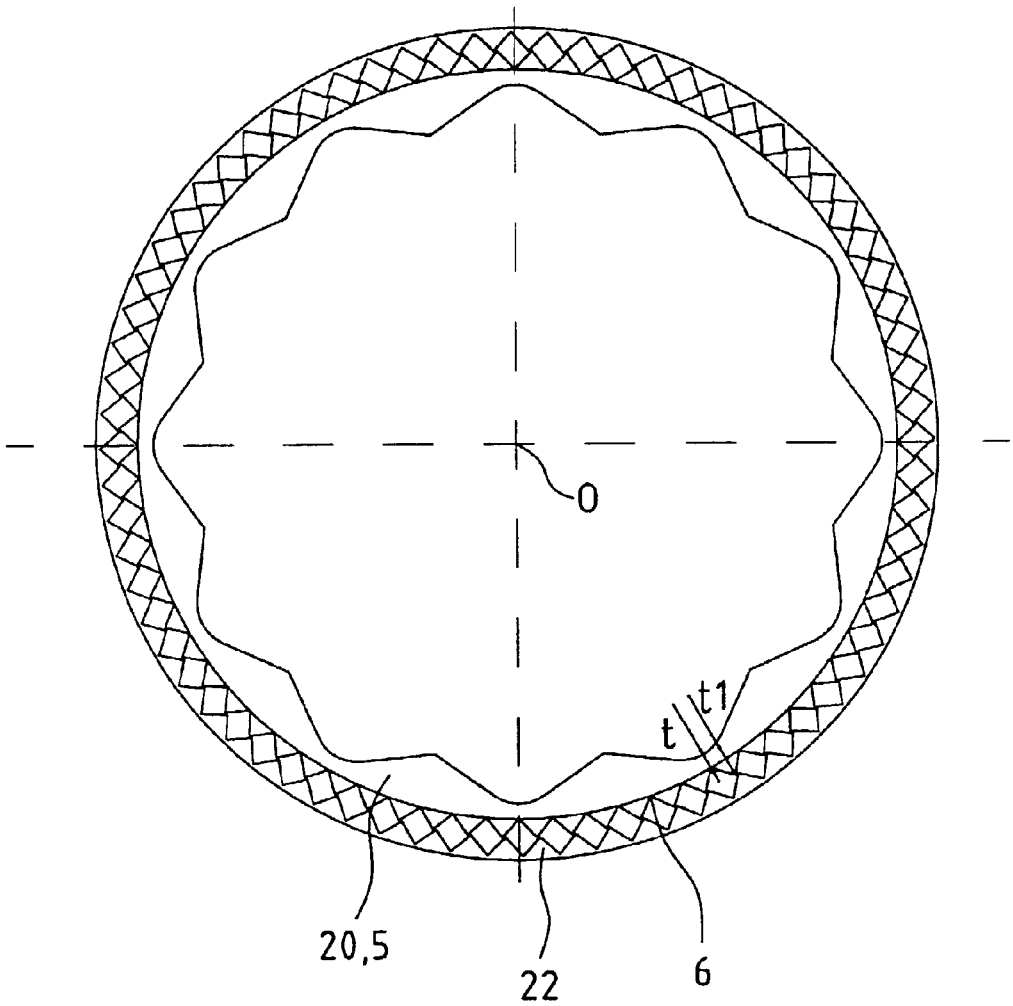
FIG. 6 is a top view, in an enlarged scale, of the ratchet wheel in accordance with the present invention, wherein *the* position of symmetric concave teeth formed according to *the* prior art is illustrated to show difference therebetween.
Figure 14:
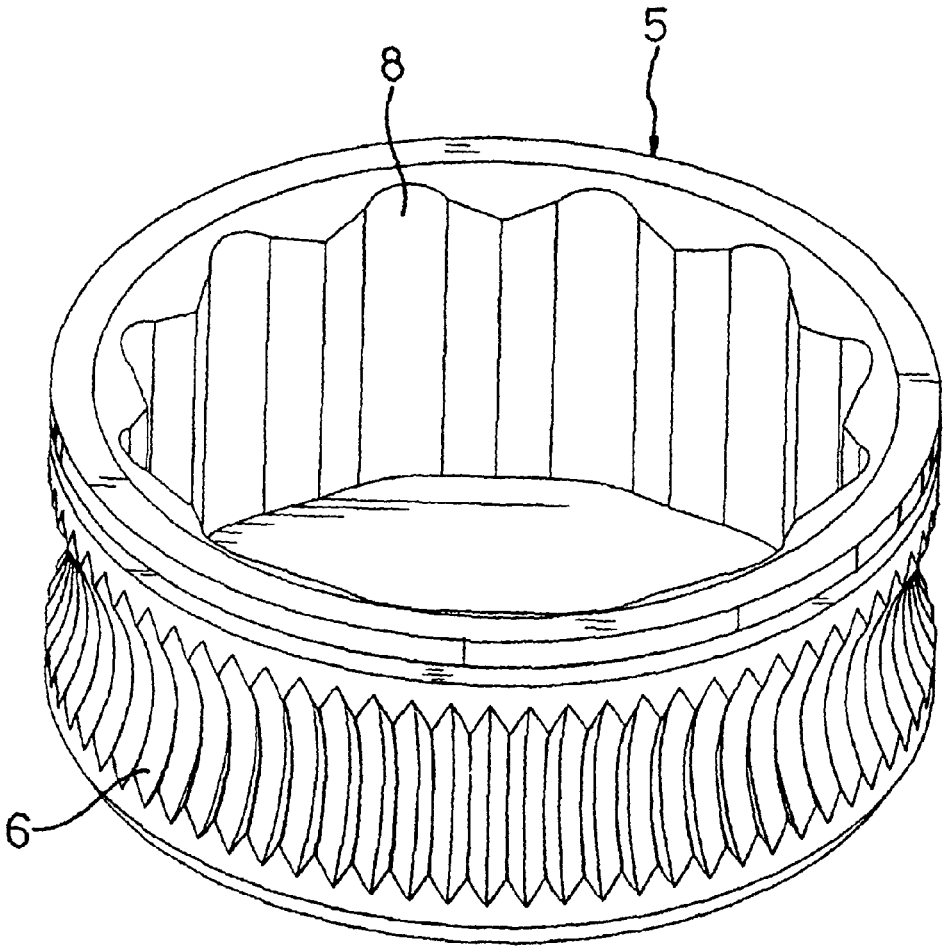
Fig. 14 PRIOR ART
FIG. 14 is a perspective view of another ratchet wheel according to *the* prior art.
Figure 15:
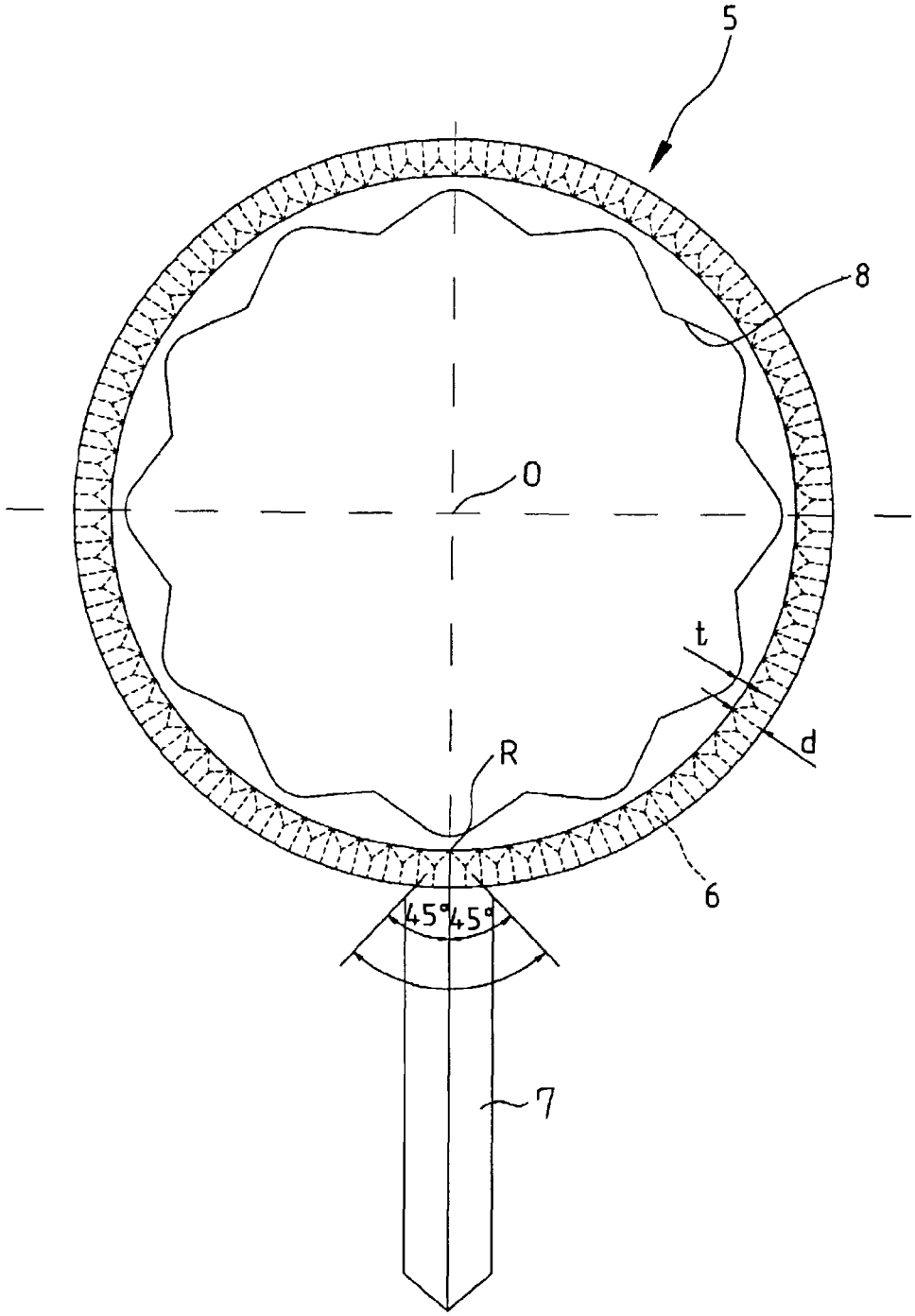
Fig. 15 PRIOR ART
FIG. 15 is a top view of the ratchet wheel in FIG. 14.
Figure 16:
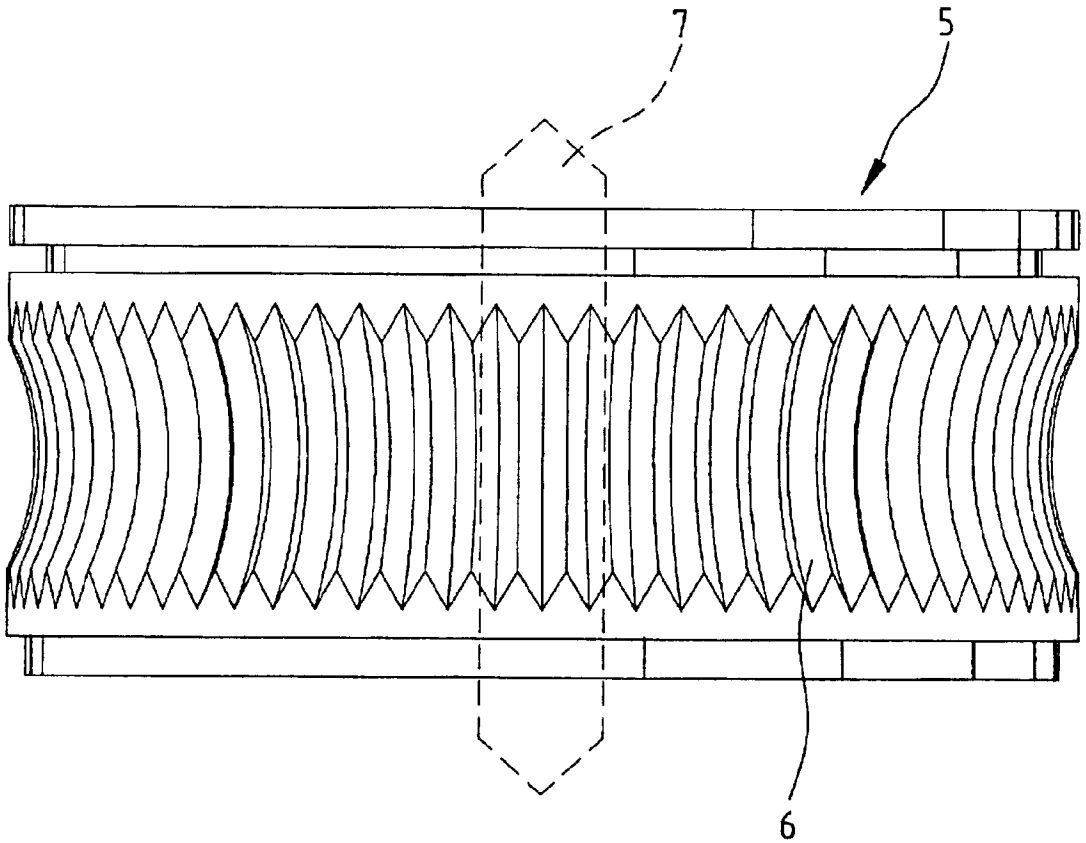
Fig. 16 PRIOR ART
FIG. 16 is a side view of the ratchet wheel in FIG. 14.
Figure 17:
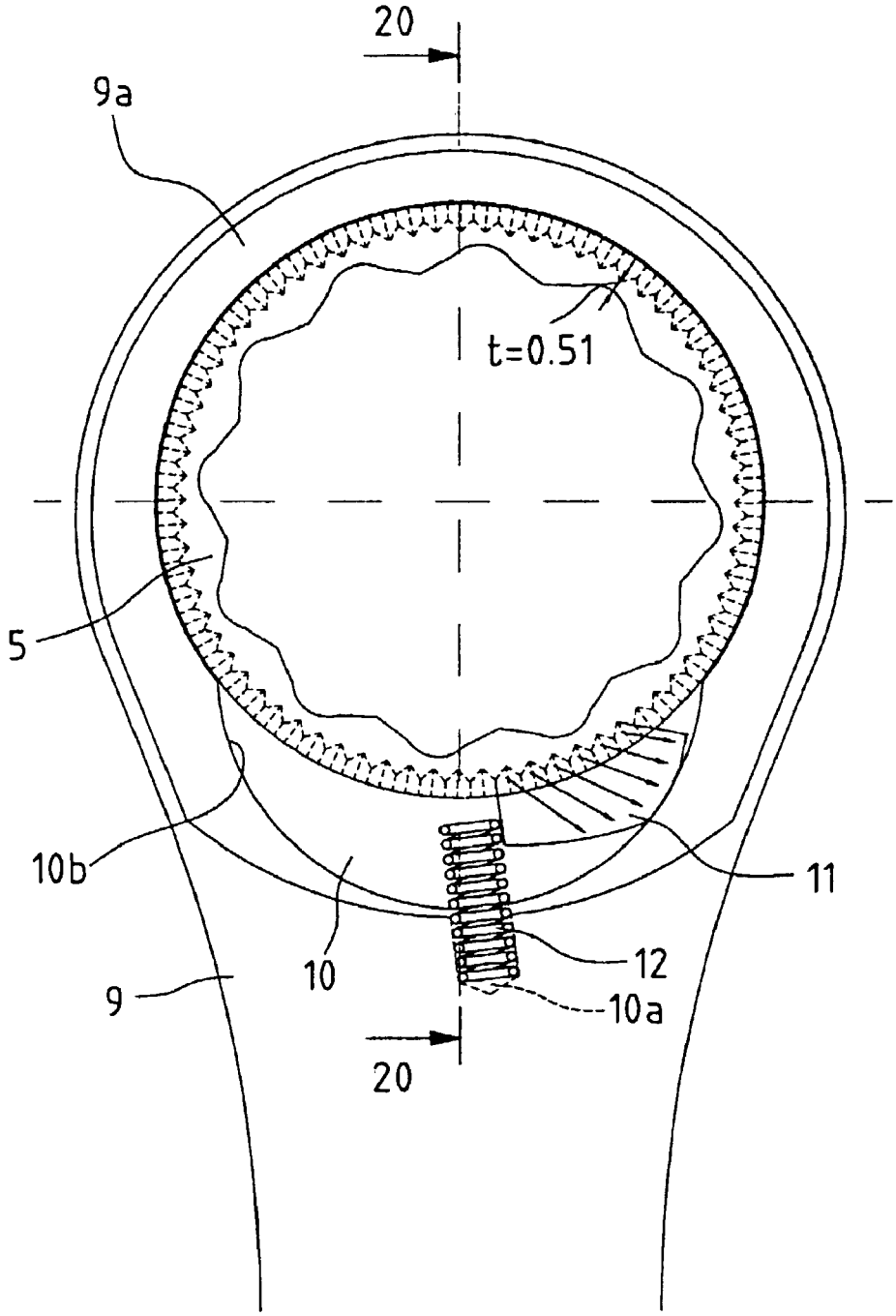
Fig. 17 PRIOR ART
FIG. 17 is a top view of a box end of a ring spanner equipped with the ratchet wheel in FIG. 14.

[Difference] *The difference* in the depth of the *concave* tooth 22 of the ratchet wheel 20 of the present invention and the depth of the *concave* tooth 6 of *the* conventional ratchet wheel 5 (FIG. 14) is illustrated in FIG. 6. Namely, the remaining *narrowest* wall thickness "$t_1$" of the ratchet wheel 20 of the present invention is greater than the remaining wall thickness "t" of *the* conventional ratchet wheel 5 that has the same size as the ratchet wheel 20. Referring to FIGS. 4 and 17, the narrowest wall thickness ($t_1$=1.01 mm in FIG. 4 for a ratchet wheel having an outer diameter of 25.76 mm) of the ratchet wheel 20 of the present invention is almost twice [as] the narrowest wall thickness (t=0.51 mm in FIG. 17 for a ratchet wheel having an outer diameter of 25.76 mm) of *the* conventional ratchet wheel 5. Thus, the structural strength and the driving torque of the ratchet wheel of the present invention are both improved.

Figure 7A:
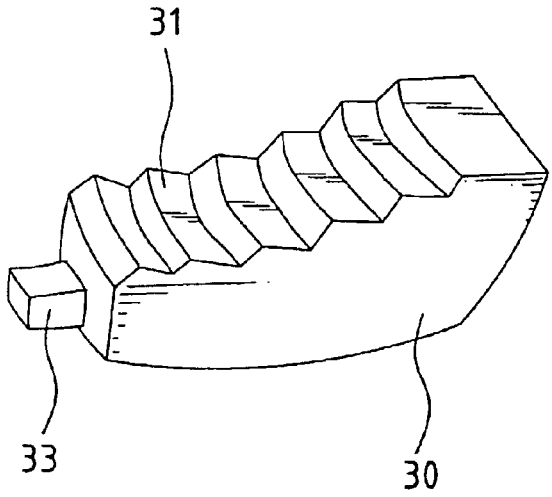
FIG. 7a is a perspective view of a pawl for cooperating with the asymmetric arcuate concave teeth of the ratchet wheel in accordance with the present invention.
Figure 7B:
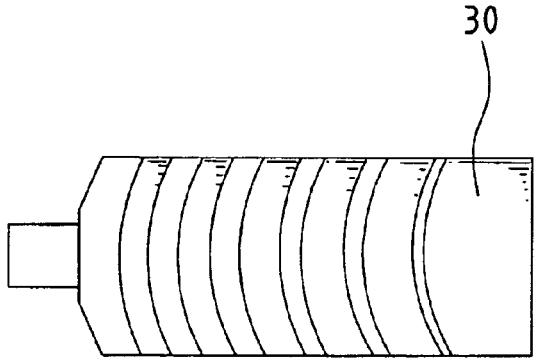
Figure 7C:
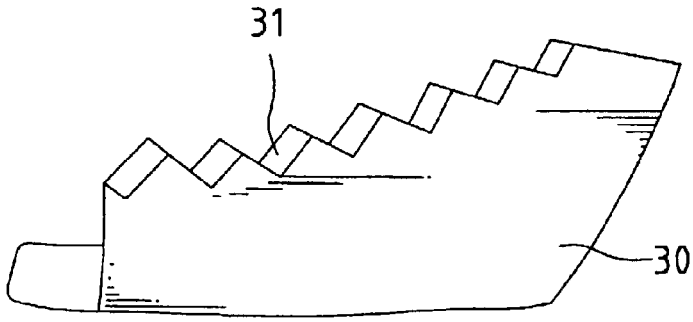
Figure 8A:
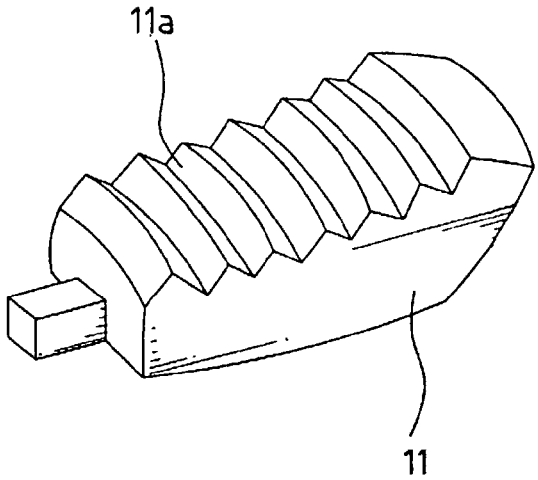
Fig. 8a PRIOR ART
FIG. 8a is a perspective view of a conventional pawl for cooperating with the arcuate concave teeth of the ratchet wheel in FIG. 14.
Figure 8B:
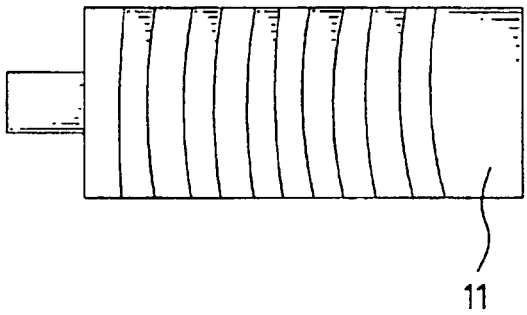
Fig. 8b PRIOR ART
Figure 8C:
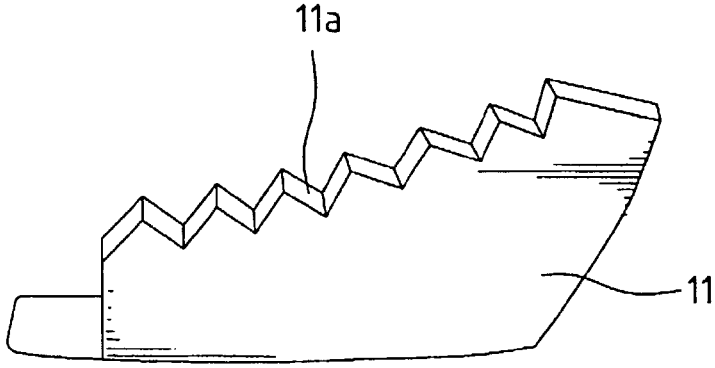
Fig. 8c PRIOR ART
Figure 20:
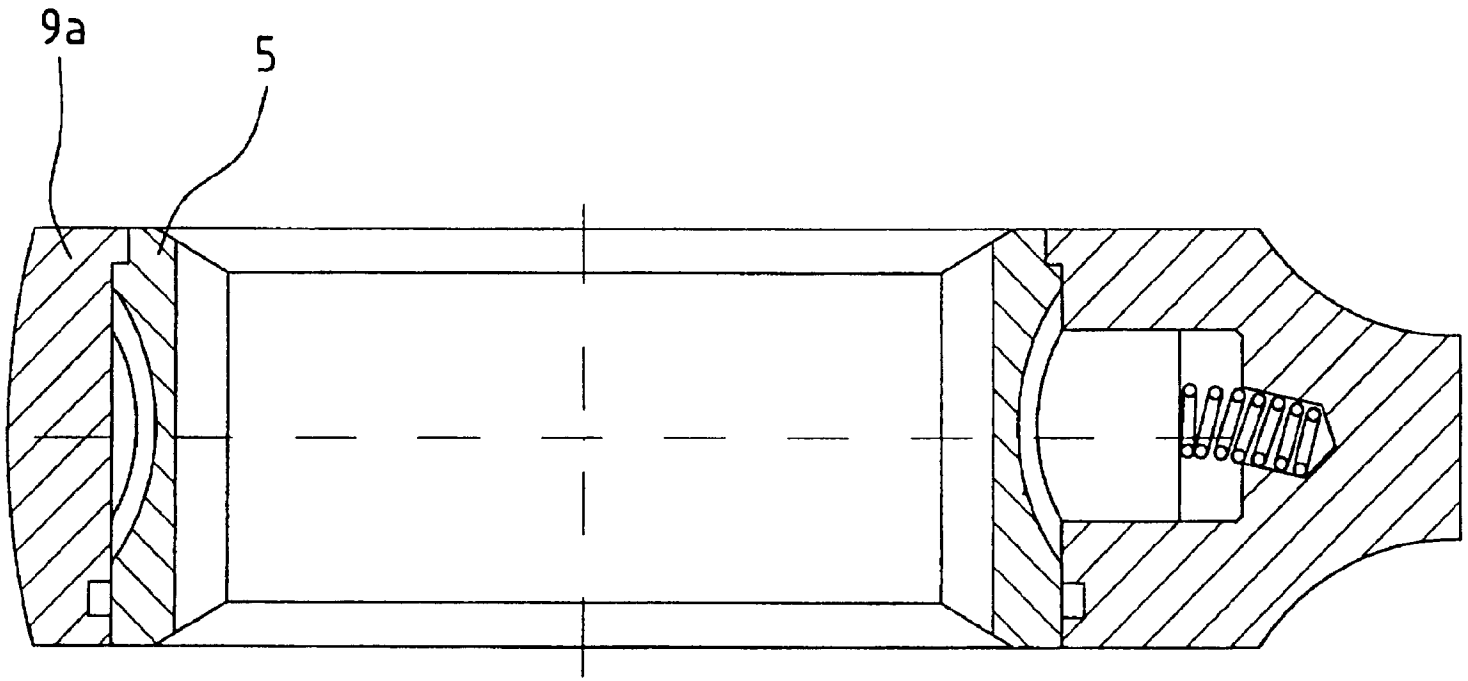
Fig. 20 PRIOR ART
FIG. 20 is a sectional view taken along line 20-20 in FIG. 17.

Referring to FIG. 4, the ratchet wind 20 in accordance with the present invention is rotatably mounted in a box end 38 of a ring spanner 40. A web area 39 between the box end 38 and a handle 42 of the ring spanner 40 includes a compartment 36 for *slidably* receiving a pawl 30. FIGS. 7a through 7c illustrate the pawl 30. The pawl 30 includes a plurality of teeth 31 that are formed complimentary to the curvatures of the asymmetric arcuate concave teeth 22. An end 33 of the pawl 30 is attached to an end of an elastic member 32 the other end of which is received in a cavity 34 defined in a wall 36a defining the compartment 36, best shown in FIG. 4. FIG. 17 illustrates a conventional arrangement of a ratchet type ring spanner 9 that has a box end 9a for rotatably receiving the ratchet wheel 5. A web area (not labeled) of the ring spanner 9 includes a compartment 10 for *slidably* receiving a pawl 11. FIGS. 8a through 8c illustrate the pawl 11. The pawl 11 includes a plurality of teeth 11a that are formed complimentary to the curvatures of the symmetric arcuate concave teeth 6. An end (not labeled) of the pawl 11 is attached to an end of an elastic member 12, the other end of which *member* is received in a cavity 10a defined in a wall 10b defining the compartment 10, best shown in FIG. 17. FIGS. 8a, 8b, 8c, and 17 are illustrated for comparison purpose. In addition, *the* difference in the wall thickness *"$t_1$"* of the ratchet wheel 20 of the present invention and the wall thickness *"t"* of conventional ratchet wheel 5 can also be clearly seen in FIG. 6 and by means of comparing FIG. 5 with FIG. 20.

Figure 9:
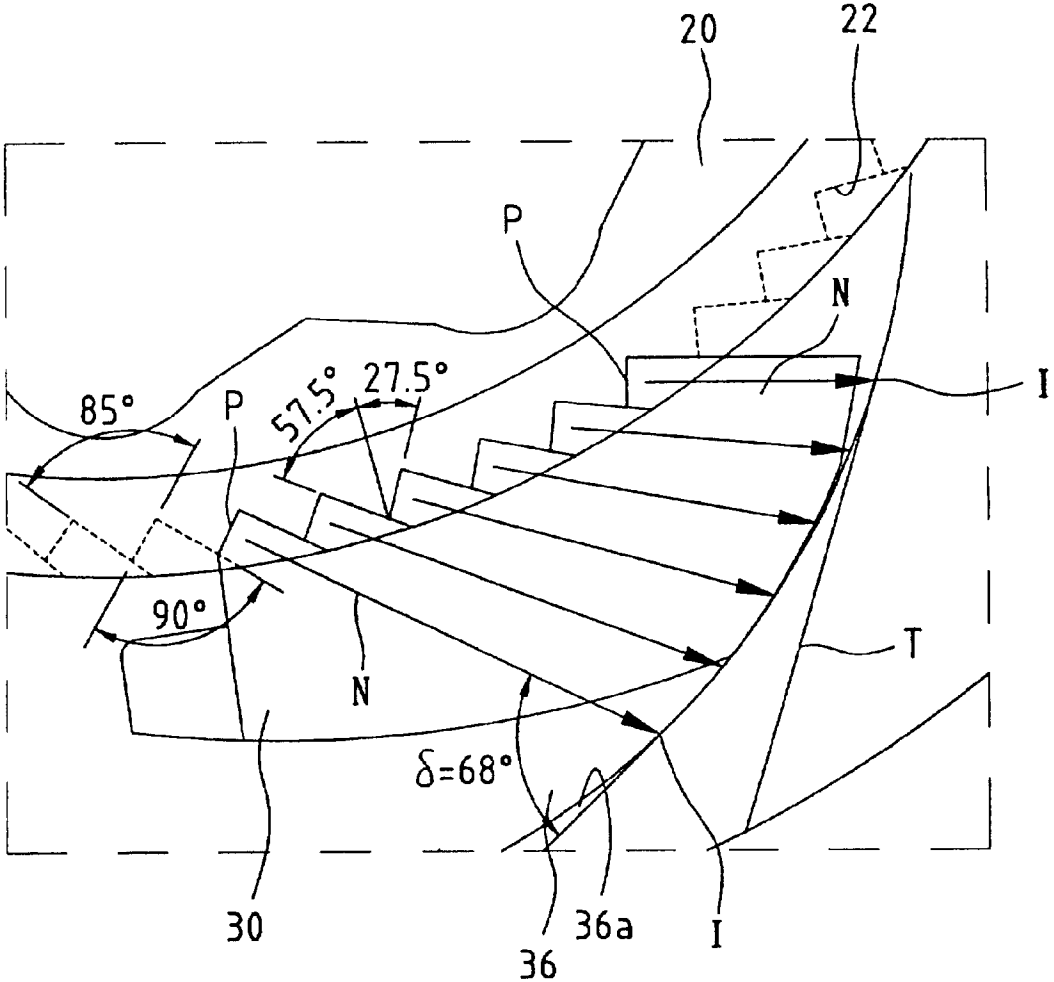
FIG. 9 is an enlarged fragmentary view illustrating operation of the pawl and the asymmetric arcuate concave teeth of the ratchet wheel in accordance with the present invention.
Figure 18:
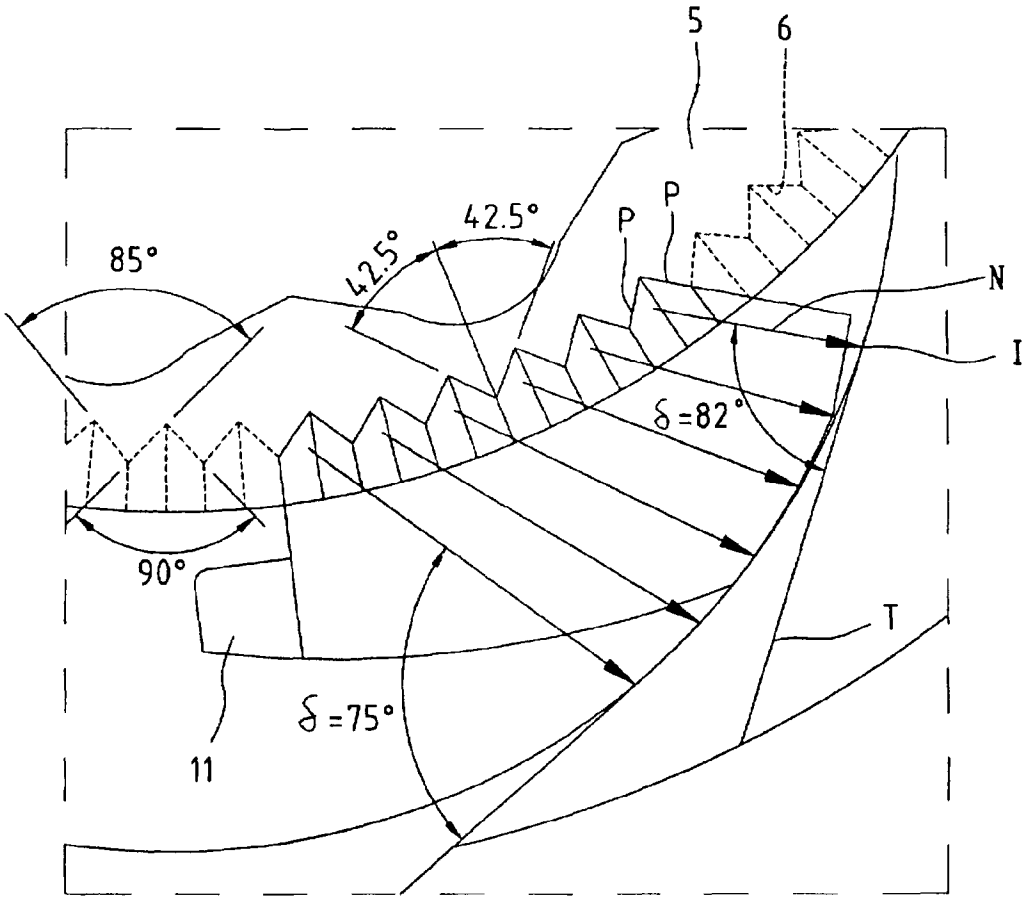
Fig. 18 PRIOR ART
FIG. 18 is an enlarged fragmentary view illustrating operation of the conventional pawl and the symmetric arcuate concave teeth of the conventional ratchet wheel in the ring spanner *in* FIG. 17.

In use of the ring spanner equipped with the ratchet wheel 20 in accordance with the present invention, referring to FIG. 9, the angle δ between a force N normal to the operative side P and the tangent T to the intersection I between the pawl 30 and the wall 36a defining the compartment 36 is smaller than that in the prior art ratchet wheel (see FIG. 18). As a result, the pawl 30 in FIG. 9 is reliably pushed toward the wall 36a defining the compartment 36 and thus provides a reliable engagement between the *concave* teeth 22 of the ratchet wheel 20 and the teeth 31 of the pawl 30. If the angle δ reaches 90°, the pawl moves toward the central area of the [ratchet wheel] *compartment* and thus results in an undesired "sliding" effect, as there is no horizontal force imparted to move the pawl toward the wall 36a of the compartment 36. Thus, the ratchet wheel 20 and the pawl 30 in accordance with the present invention provides an engagement *more* reliable than that between the conventional ratchet wheel 5 and the pawl 11 and thus less likely to "slide". The spanner with the ratchet wheel/pawl combination in accordance with the present invention can be used in a relatively small space and can be operated in a convenient manner. More specifically, the spanner is allowed to rotate in a reverse direction without disengaging the box end from the fastener when the spanner is stopped by an obstacle during ratcheting[. And], *and* the spanner is then ready for *the* next ratcheting movement. This is very convenient and timesaving.

Figure 10:
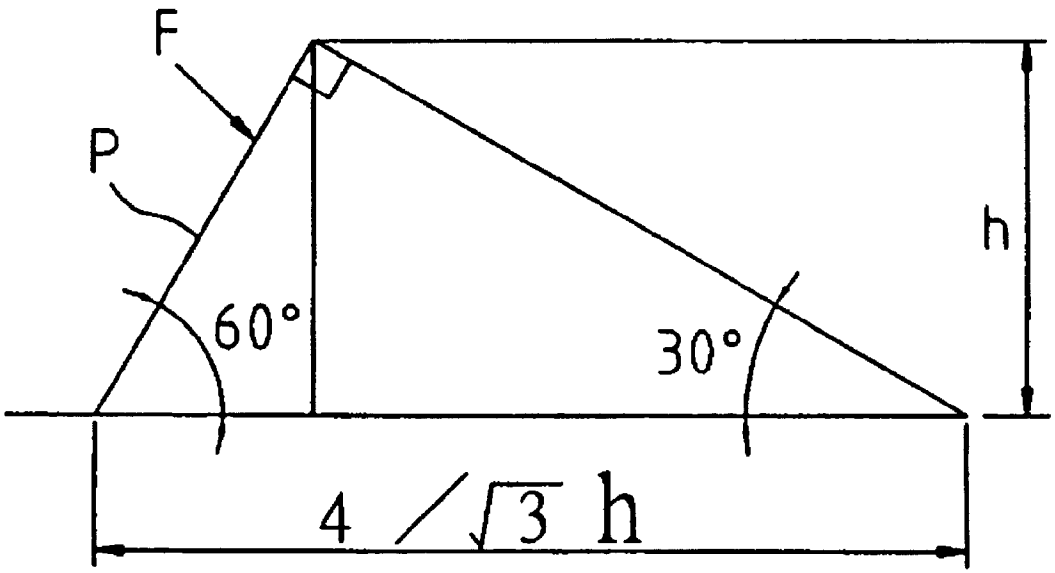
FIG. 10 is a schematic force diagram of the asymmetric arcuate concave tooth of the ratchet wheel in accordance with the present invention.
Figure 11:
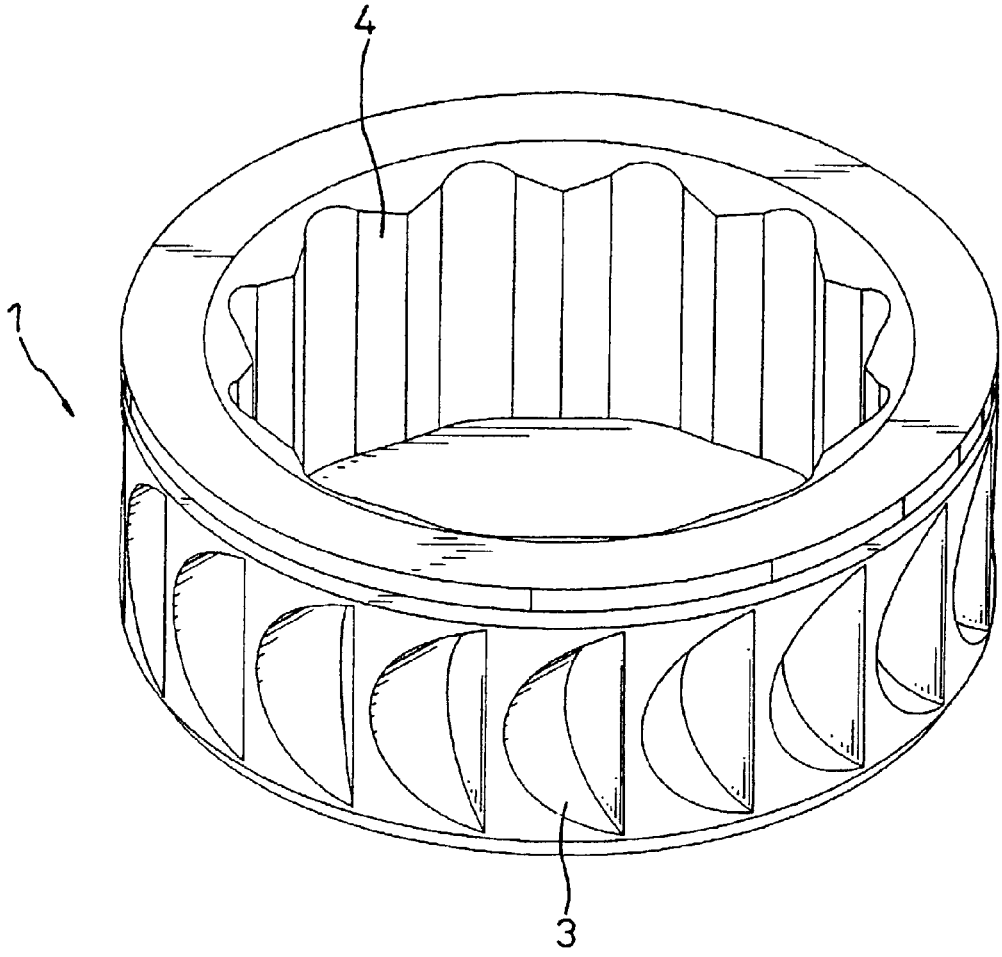
Fig. 11 PRIOR ART
FIG. 11 is a perspective view of a ratchet wheel according to *the* prior art.
Figure 12:
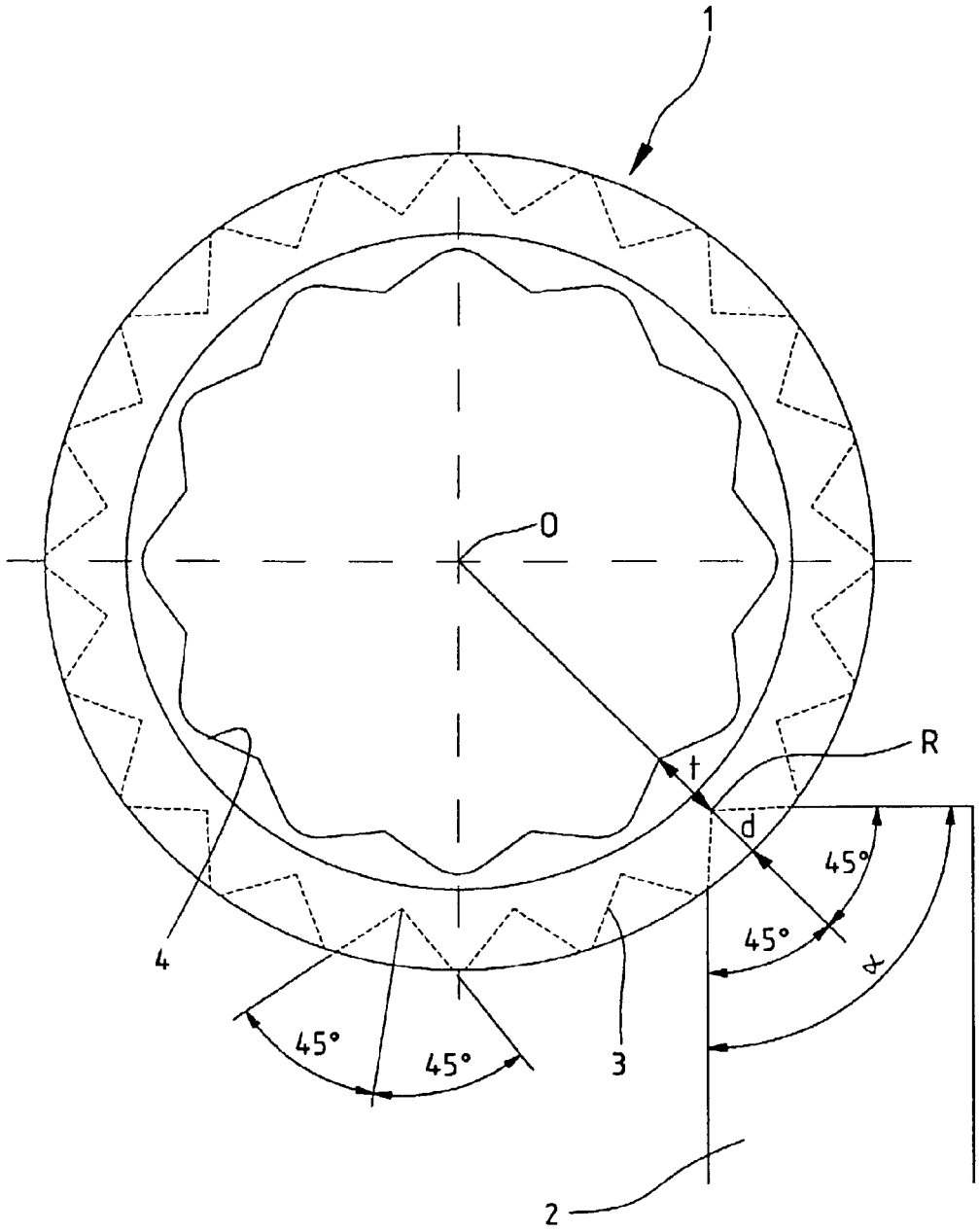
Fig. 12 PRIOR ART
FIG. 12 is a top view of the ratchet wheel in FIG. 11.
Figure 13:
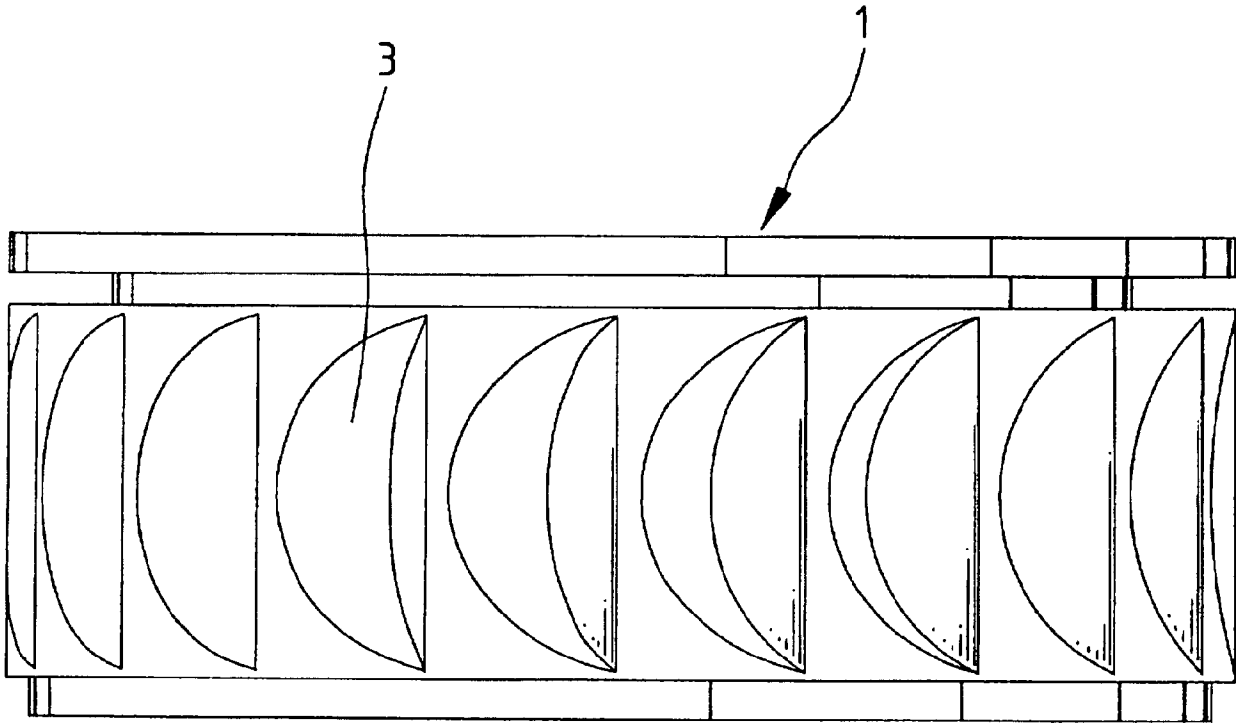
Fig. 13 PRIOR ART
FIG. 13 is a side view of the ratchet wheel in FIG 11.
Figure 19:
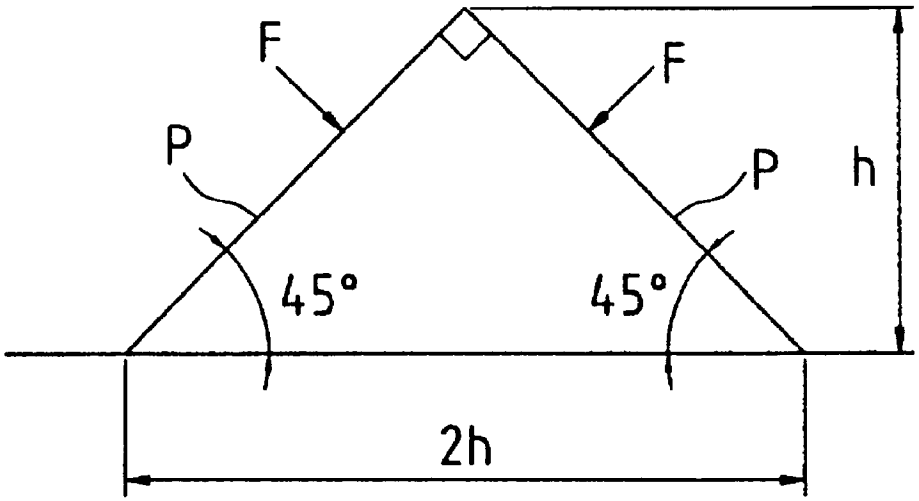
Fig. 19 PRIOR ART
FIG. 19 is a schematic force diagram of the ratchet wheel in FIG. 14.

Referring to FIGS. 9 and 10, when the operative side P of the *concave* tooth 22 of the ratchet wheel 20 in accordance with the present invention is subjected to a force F during ratcheting, the area filled by the pawl 30 for bearing such force F is $2/1.732\ h^2$. Referring to FIG. 19, for a conventional ratchet wheel 5, when either operative side P of the *concave* tooth 6 of the ratchet wheel 5 is subjected to a force F, the area filled by the pawl 11 for bearing such force F is $h^2$ which is smaller than that provided by the ratchet wheel/pawl combination in accordance with the present invention. Namely, the ratchet wheel 20 with asymmetric arcuate concave teeth 22 provides a higher torque for ratcheting (i.e., tightening or loosening a fastener such as a nut or bolt head).

Figure 21:
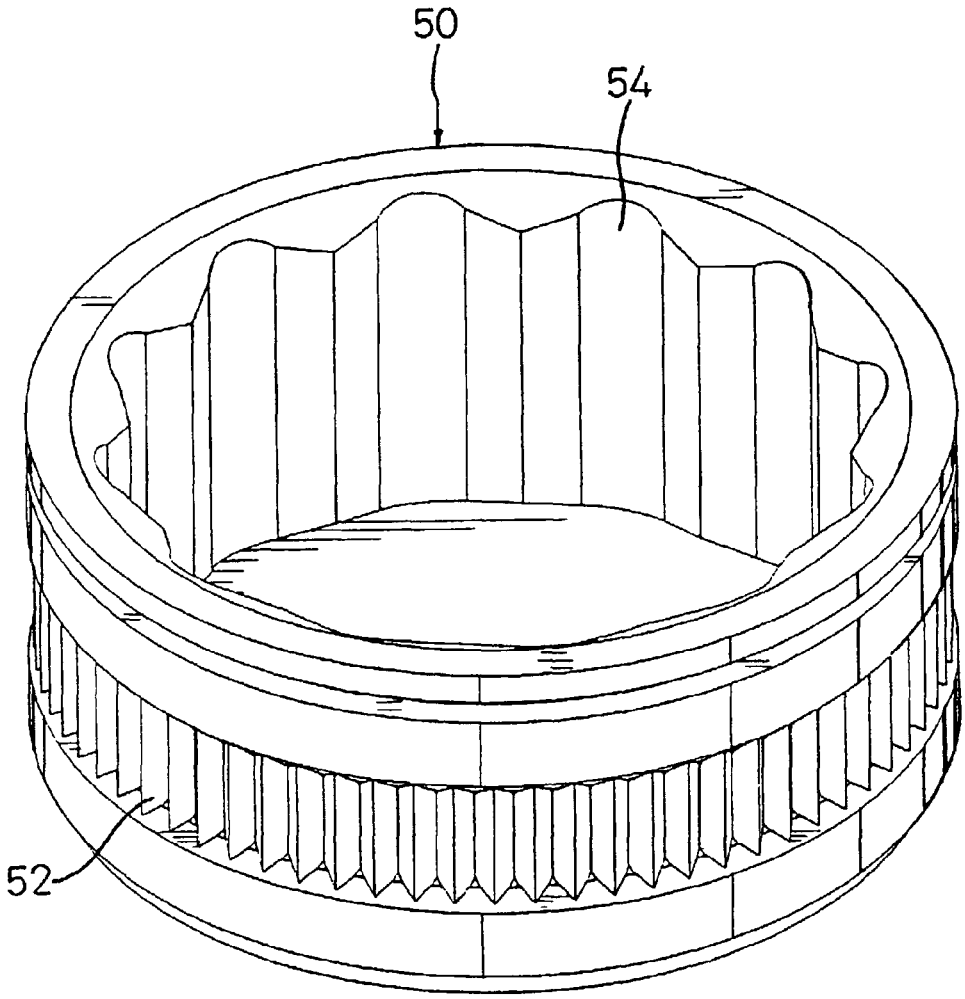
FIG. 21 is a perspective view of a ratchet wheel with non-arcuate concave teeth in accordance with the present invention.

Referring to FIGS. 21 and 22, in a second embodiment of the ratchet wheel in accordance with the present invention, the ratchet wheel (now designated by 50) includes an inner periphery 54 for driving a fastener (not shown) and an outer periphery having a plurality of non-arcuate concave teeth 52. The non-arcuate concave teeth 52 [is] *are* formed by means of roll squeezing method, investment casting, or molding, which is quicker than formation by *a* cutter. Each non-arcuate concave tooth 52 may be trapezoidal, triangular, or any other shape that results from formation other than cutting. The production cost for the ratchet wheel 50 with non-arcuate concave teeth 52 in accordance with the present invention is largely reduced, as the production time for the non-arcuate concave teeth 52 is relatively short. In addition, the non-arcuate concave teeth 52 may be symmetric or asymmetric. When the ratchet wheel 50 has non-arcuate symmetric concave teeth 52, the resultant structure provides a driving torque approximately the same as that provided by the conventional ratchet wheel 5 with symmetric arcuate concave teeth 6. When the ratchet wheel 50 has non-arcuate asymmetric concave teeth 52 configured similar to *concave* teeth 22, the resultant structure provides a higher driving torque than that provided by the conventional ratchet wheel 5 with symmetric arcuate concave teeth 6.

*Each concave tooth 52 is defined by two sides each including a radially inner linear edge 52a and a radially outer linear edge 52b. Each concave tooth 52 is further defined by a first intersection of the radially inner linear edges 52a of each of the two sides with an adjacent tooth 52 and by a second intersection of the radially outer linear edges 52b of the two sides and which is substantially parallel to the first arcuate intersection. The plurality of concave teeth 52 have an axial extent less than that between the axial ends 51a and 51b and are axially spaced therefrom so that first and second axially spaced portions 53a and 53b are defined between each of the axial ends 51a and 51b and concave teeth 52. Each non-arcuate tooth 52 has third and fourth axial ends 53e that are spaced radially inside from the outer periphery of ratchet wheel 50. Inclined annular walls 53d extend between the outer periphery of the ratchet wheel 50 and the axial ends 53e, with the inclined annular walls 53d having decreasing radial spacing from the outer periphery of the ratchet wheel 50 to the axial ends 53e.*

Figure 23:
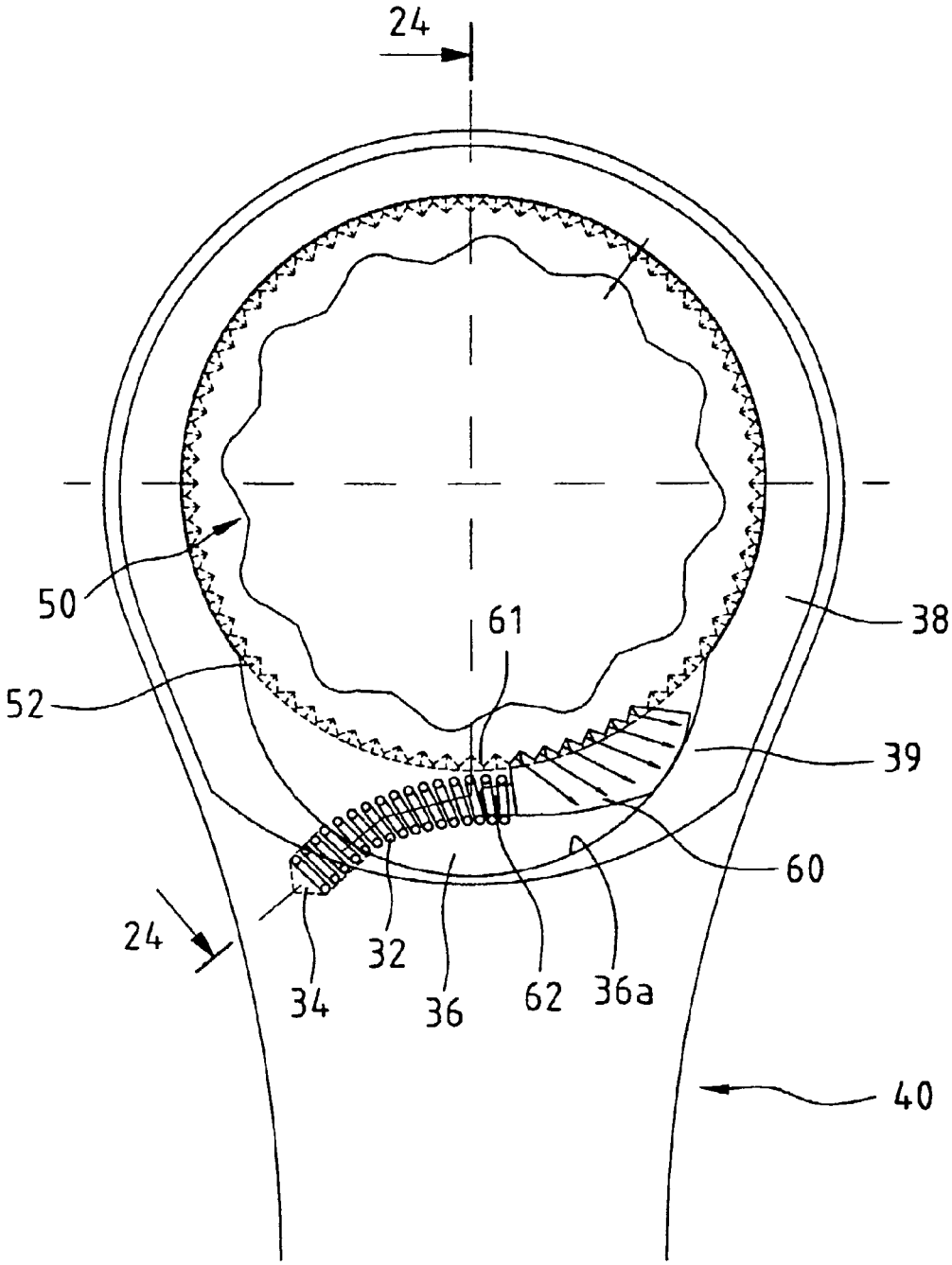
FIG. 23 is a top view of a box end of a ring spanner equipped with the ratchet wheel in FIG. 21.
Figure 25:
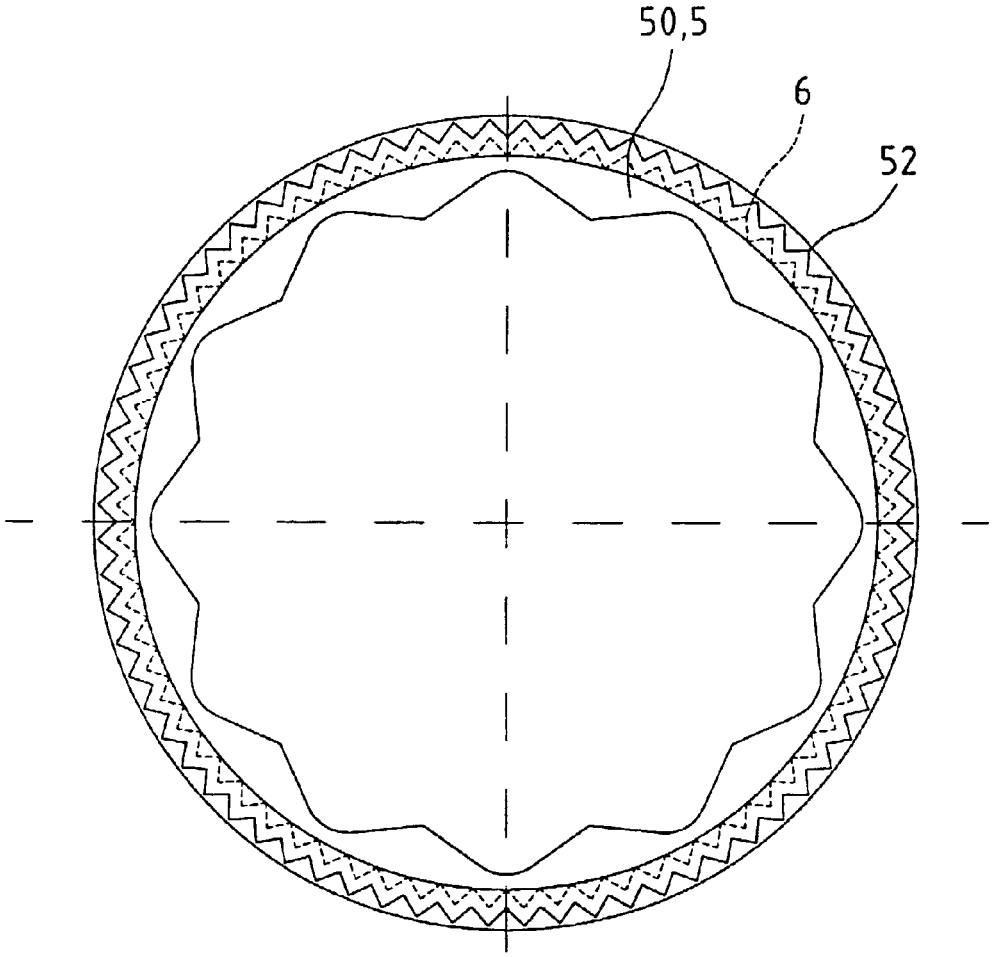
FIG. 25 is a top view of the ratchet wheel in FIG. 21, wherein *the* position of symmetric concave teeth formed according to *the* prior art is illustrated to show difference therebetween.
Figure 26A:
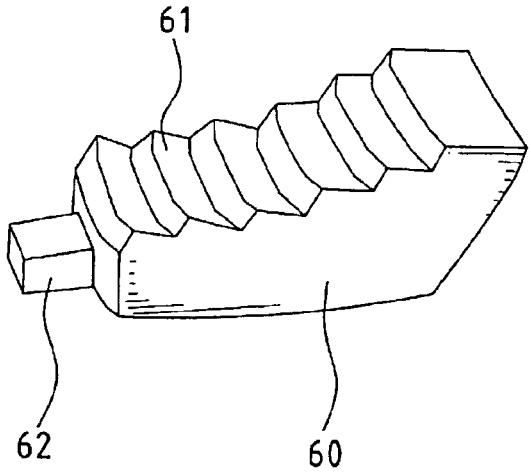
FIG. 26a is a perspective view of a pawl for cooperating with the non-arcuate concave teeth of the ratchet wheel in FIG. 23.
Figure 26B:
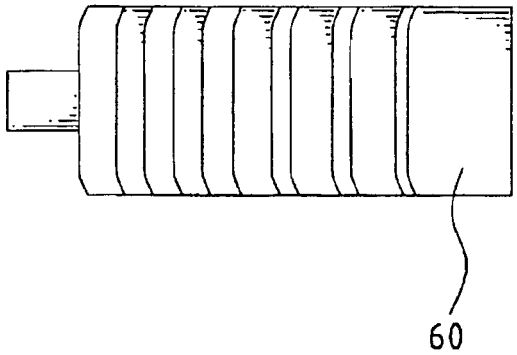
Figure 26C:
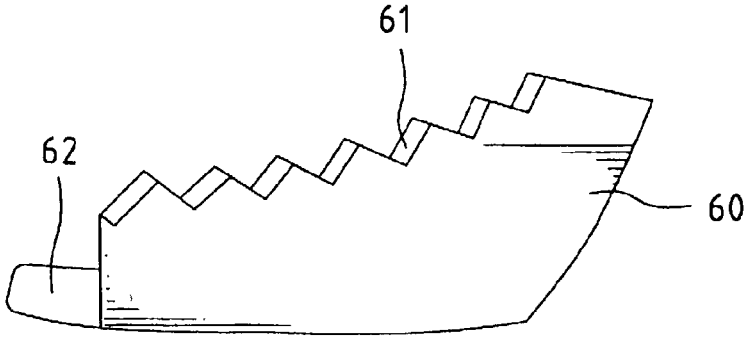

Referring to FIG. 23, the ratchet wheel 50 in accordance with the present invention may be rotatably mounted in a box end 38 of a ring spanner 40. A web area 39 of the ring spanner 40 includes a compartment 36 for receiving a pawl 60. FIGS. 26a through 26c illustrate the pawl 60. The pawl 60 includes a plurality of teeth 61 that are formed complimentary to the curvatures of the non-arcuate concave teeth 52. An end 62 of the pawl 60 is attached to an end of an elastic member 32, the other end of which is received in a cavity 34 defined in a wall 36a defining the compartment 36, best shown in FIG. 23. A detail comparison between the conventional pawl 11 illustrated in FIGS. 8a through 8c, the pawl 30 of the first embodiment of the present invention illustrated in FIGS. 7a through 7c, and the pawl 60 of this embodiment illustrated in FIGS. 26a through 26c would be appreciated. In addition, difference in the wall thickness of the ratchet wheel 50 of the present invention and the wall thickness of conventional ratchet wheel 5 can also be clearly seen in FIG. 25 and by means of comparing FIG. 24 with FIG. 20.

According to the above description, it is appreciated that the ratchet wheel with asymmetric arcuate concave teeth in accordance with the present invention provides a higher torque for operation and has improved structural strength as having a thicker wall in the ratchet wheel. The engagement between the ratchet wheel with asymmetric arcuate concave teeth and the pawl with asymmetric arcuate concave teeth is more reliable. The ratchet wheel with non-arcuate concave teeth in accordance with the present invention reduces the production cost for the ratchet wheel. The ratchet wheel with non-arcuate concave teeth also provides a higher torque for operation when the non-arcuate concave teeth is asymmetric. A spanner with the ratchet wheel/pawl combination in accordance with the present invention can be used in a relatively small space. Nevertheless, the ratchet wheel/pawl combination in accordance with the present invention is not limited to be used in the box end of a ring spanner. Namely, the ratchet wheel/pawl combination may be used in other ratcheting tools such as ratchet wrenches.

Although the invention has been explained in relation to its preferred embodiment, it is to be understood that many other possible modifications and variations can be made without departing from the spirit and scope of the invention as hereinafter claimed.

What is claimed is:

[1. A ratchet wheel comprising an inner periphery and an outer periphery, the outer periphery including a plurality of asymmetric arcuate concave teeth each having two sides and an intersection of the two sides, the ratchet wheel including a center, a line from the center to the intersection dividing an angle between the two sides into two unequal portions.]

[2. A ratchet wheel comprising an inner periphery and an outer periphery, the outer periphery including a plurality of asymmetric non-arcuate concave teeth each having two sides and an intersection of the two sides, the ratchet wheel including a center, a line from the center to the intersection dividing an angle between the two sides into two unequal portions.]

[3. The ratchet wheel as claimed in claim 2, wherein said asymmetric non-arcuate concave teeth are not formed by cutting.]

[4. The ratchet wheel as claimed in claim 2, wherein said asymmetric non-arcuate concave teeth are formed by roll squeezing.]

[5. The ratchet wheel as claimed in claim 2, wherein said asymmetric non-arcuate concave teeth are formed by investment casting.]

[6. The ratchet wheel as claimed in claim 2, wherein each said asymmetric non-arcuate concave tooth is trapezoidal.]

[7. The ratchet wheel as claimed in claim 2, wherein each said asymmetric non-arcuate concave tooth is of a shape formed as a result of formation other than cutting.]

8. A ratchet wheel comprising an inner periphery [and], an outer periphery *and first and second axial ends*, the outer periphery including a plurality of symmetric [non-arcuate concave] teeth each [having] *formed into the outer periphery to have a radial depth and be defined by* two sides, *with the plurality of symmetric teeth radially spaced inwards from the outer periphery,* and [an] *by a non-arcuate* intersection of the two sides, *wherein the plurality of symmetric teeth have an axial extent less than an axial extent between the first and second axial ends and are axially spaced from each of the first and second axial ends so that first and second axially spaced portions are defined between each of the first and second axial ends and the symmetrical teeth and the plurality of symmetrical teeth are intermediate the first and second axially spaced portions, wherein* the ratchet wheel [including] *includes* a center[.] *and* a *radial* line from the center [to] *through* the *non-arcuate* intersection [dividing] *divides* an angle *that is defined* between the two sides into two equal *angle* portions, *and wherein each tooth has a third axial end that is radially spaced inwards from the outer periphery of the ratchet wheel, with an inclined annular wall extending between the outer periphery of the ratchet wheel and the third axial end, with the inclined annular wall having decreasing radial spacing from the outer periphery of the ratchet wheel to the third axial end.*

[9. The ratchet wheel as claimed in claim 8, wherein said symmetric non-arcuate concave teeth are not formed by cutting.]

10. The ratchet wheel as claimed in claim 8, wherein said *two sides of each of the* symmetric [non-arcuate concave] teeth are [formed by] *of a formation resulting from* roll squeezing.

11. The ratchet wheel as claimed in claim 8, wherein said *two sides of each of the* symmetric [non-arcuate concave] teeth are [formed by] *of a formation resulting from* investment casting.

12. The ratchet wheel as claimed in claim 8, wherein each said symmetric [non-arcuate concave] tooth is trapezoidal.

[13. The ratchet wheel as claimed in claim 8, wherein each said symmetric non-arcuate concave tooth is of a shape formed as a result of formation other than cutting.]

[14. A ratcheting tool comprising:

a handle and an end connected to the handle, the end including a hole, a compartment being defined in an area between the handle and the end;

a ratchet wheel rotatably mounted in the hole of the end, the ratchet wheel comprising an inner periphery and an outer periphery, the outer periphery including a plurality of asymmetric arcuate concave teeth each having two sides and an intersection of the two sides, the ratchet wheel including a center, a line from the center to the intersection dividing an angle between the two sides into two unequal portions;

a pawl slidably mounted in the compartment and engaged with the ratchet wheel, the pawl comprising a plurality of teeth corresponding to the asymmetric arcuate concave teeth of the ratchet wheel; and means for biasing the pawl toward a wall defining the compartment.]

15. A ratcheting tool comprising:

a handle and an end connected to the handle, the end including a hole, a compartment, *that is open towards the hole,* being [defined] *formed* in an area between the handle and the end *and defined by a wall*;

a ratchet wheel comprising an inner periphery [and], an outer periphery *and first and second axial ends*, the outer periphery including a plurality of asymmetric [non-arcuate concave] teeth [having] *each formed into the outer periphery to have a radial depth and be defined by* two sides, *wherein the plurality of asymmetric teeth have an axial extent less than an axial extent between the first and second axial ends and are axially spaced from each of the first and second axial ends so that first and second axially spaced portions are defined between each of the first and second axial ends and the asymmetric teeth, wherein the plurality of asymmetrical teeth are intermediate the first and second axially spaced portions, with each of the two sides including a radially inner linear edge* and [an] *a radially outer linear edge, with each tooth further defined by a first non-arcuate* intersection of the *inner radial inner linear edge of each of the* two sides[, the ratchet wheel including a center, a line from the center to the intersection dividing an angle between the two sides into two unequal portions] *with an adjacent tooth and by a second non-arcuate intersection of the radially outer linear edges of the two sides and which is substantially parallel to the first non-arcuate intersection*;

a pawl slidably [mounted] *received* in the compartment and engaged with the ratchet wheel, the pawl comprising a plurality of teeth *each complimentarily* corresponding to *each of* the *plurality of* asymmetric [non-arcuate concave] teeth of the ratchet wheel; and means for *engaging an end of the pawl and* biasing the pawl toward a *wall portion of the* wall defining the compartment*;*

*wherein the two sides include an operative side and the operative sides of the asymmetric teeth configured to cooperate with the teeth of the pawl in said ratcheting tool during ratcheting for pushing the pawl in each case by a plurality of the operative sides against said wall portion to provide for a reliable engagement of the teeth of the pawl into the asymmetric teeth of the ratchet wheel,*

*wherein the second non-arcuate intersection is radially spaced inwards of the outer periphery, wherein the ratchet wheel includes a center, and with a line from the center to the first non-arcuate intersection dividing an angle between the two sides into two unequal angle portions, wherein each tooth of the ratchet wheel has a third axial end that is radially spaced inwards from the outer periphery of the ratchet wheel, with an inclined annular wall extending between the outer periphery of the ratchet wheel and the third axial end, with the inclined annular wall having decreasing radial spacing from the outer periphery of the ratchet wheel to the third axial end.*

16. The [ratchet wheel] *ratcheting tool* as claimed in claim 15, wherein said *two sides of each of the* asymmetric [non-arcuate concave] teeth are [formed by] *of a formation resulting from* roll squeezing.

[17. The ratchet wheel as claimed in claim 15, wherein each said asymmetric non-arcuate concave tooth is of a shape formed as a result of formation other than cutting.]

18. A ratcheting tool comprising:

a handle and an end connected to the handle, the end including a hole, a compartment [being defined] in an area between the handle and the end, *the compartment having a crescent shape between the hole and a wall defining the compartment*;

a ratchet wheel comprising an inner periphery [and], an outer periphery *and first and second axial ends*, the outer periphery including a plurality of symmetric [non-arcuate concave] teeth each [having] *formed into the outer periphery to have a radial depth and be defined by* two sides *radially spaced inwards from the outer periphery, wherein the plurality of symmetric teeth have an axial extent less than an axial extent between the first and second axial ends and are axially spaced from each of the first and second axial ends so that first and second axially spaced portions are defined between each of the first and second axial ends and the symmetric teeth, wherein the plurality of symmetrical teeth are intermediate the first and second axially spaced portions, with each of the two sides including a radially inner edge* and [an] *a radially outer edge, with each symmetric tooth further defined by a first non-arcuate* intersection of the *radially inner edge of each of the* two sides *with an adjacent tooth and by a non-arcuate intersection of the radially outer edges of the two sides and which is parallel to the first non-arcuate intersection, wherein* the [ratchet wheel including a center, a line from the center to the] *non-arcuate* intersection [dividing an angle between] *of the radially outer edges of* the two sides [into two equal portions] *is radially spaced inwards of the outer periphery*;

a pawl slidably mounted in the compartment and engaged with the ratchet wheel, the pawl comprising a plurality of teeth *each complimentarily* corresponding to *each of* the symmetric non-arcuate [concave] teeth of the ratchet wheel; and means for *engaging the pawl and* biasing the pawl toward a *curved wall portion of the* wall defining the compartment*;*

*wherein the two sides include an operative side and the operative sides of the symmetric teeth of the ratchet wheel are configured to cooperate with the engaging teeth of the pawl during ratcheting for pushing the pawl in each case by a plurality of the operative sides against said curved wall portion to provide for a reliable engagement of the teeth of the pawl into the symmetric teeth, and*

*the ratchet wheel includes a center, with a radial line from the center to the first non-arcuate intersection dividing an angle that is defined between the two sides into two equal angle portions, and*

*each tooth has a third axial end that is radially spaced inwards from the outer periphery of the ratchet wheel, with an inclined annular wall extending between the outer periphery of the ratchet wheel and the third axial end, with the inclined annular wall having decreasing radial spacing from the outer periphery of the ratchet wheel to the third axial end.*

19. The [ratchet wheel] *ratcheting tool* as claimed in claim 18, wherein said *two sides of each of the* symmetric [non-arcuate concave] teeth are [formed by] *of a formation resulting from* roll squeezing.

[20. The ratchet wheel as claimed in claim 18, wherein each said symmetric non-arcuate concave tooth is of a shape formed as a result of formation other than cutting.]

*21. A ratcheting tool comprising:*

*a handle and an end connected to the handle, the end including a hole having an inner periphery,*

*a compartment that is in open communication with the hole, the compartment formed between the inner periphery of the hole and a wall defining the compartment;*

*a ratchet wheel having a first axial end, a second axial end, and an outer periphery, with the outer periphery including a plurality of symmetric teeth each formed into the outer periphery to have a radial depth and be defined by two sides, with each of the two sides including a radially inner linear edge and a radially outer linear edge, with each symmetric tooth further defined by a first non-arcuate intersection of the radially inner linear edge of each of the two sides with an adjacent symmetrical tooth and by a non-arcuate intersection of the radially outer linear edges of the two sides and which is substantially parallel to the first non-arcuate intersection; and*

*a pawl slidably received in the compartment and engaged with the ratchet wheel, the pawl including a plurality of teeth that each complimentarily correspond to each of the symmetric teeth of the ratchet wheel and being biased by an elastic member toward a curved wall portion of said wall defining the compartment;*

*wherein the two sides include an operative side and the operative sides of the symmetric teeth are configured to cooperate with the plurality of teeth of the pawl during ratcheting for pushing the pawl in each case by a plurality of the operative sides against said curved wall portion to provide for a reliable engagement of the teeth of the pawl into the symmetric teeth of the ratchet wheel;*

*wherein the ratchet wheel includes a center and a radial line from the center through the first non-arcuate intersection divides an angle that is defined between the two sides into two equal angle portions, with the plurality of symmetric teeth having a maximum radial extent from the center less than the outer periphery; and*

*wherein the plurality of symmetrical teeth have an axial extent less than an axial extent between the first and second axial ends and are axially spaced from each of the first and second axial ends so that first and second axially spaced portions are defined between each of the first and second axial ends and the symmetrical teeth and the plurality of symmetrical teeth are intermediate the first and second axially spaced portions, each tooth having a third axial end that is radially spaced inwards from the outer periphery of the ratchet wheel, with an inclined wall extending between an adjacent one of the first and second axially spaced portions and the third axial end, with the inclined wall having decreasing radial spacing from the adjacent one of the first and second axially spaced portions to the third axial end.*

*22. The ratcheting tool as claimed in claim 21, wherein the first axially spaced portion includes a radially extending annular recess.*

*23. The ratcheting tool as claimed in claim 22, with the first and second axially spaced portions having equal radial extents.*

*24. A ratchet wheel in combination with a pawl configured to be slidably received in a compartment of a ratcheting tool*

*that is defined by a wall and to be biased by an elastic member toward a wall portion of said wall,*

*the ratchet wheel having a first axial end, a second axial end, and an outer periphery, with the outer periphery including a plurality of symmetric teeth each formed into the outer periphery to have a radial depth and be defined by two sides, with each of the two sides including a radially inner linear edge and a radially outer linear edge, with each tooth further defined by a first non-arcuate intersection of the radially inner linear edge of each of the two sides with an adjacent tooth and by a second non-arcuate intersection of the radially outer linear edges of the two sides and which is substantially parallel to the first non-arcuate intersection,*

*the ratchet wheel including a center, with a radial line from the center through the first non-arcuate intersection dividing an angle between the two sides into two equal portions, with the plurality of symmetric teeth having a maximum radial extent from the center less than the outer periphery,*

*the pawl including a plurality of teeth that each are formed complimentarily to each of the teeth of the ratchet wheel and that are engaged by a plurality of operative sides of the teeth of the ratchet wheel, the pawl further configured to be pushed by the plurality of operative sides against said wall portion to provide for a reliable engagement of the teeth of the pawl into the teeth of the ratchet wheel,*

*the plurality of symmetrical teeth having an axial extent less than an axial extent between the first and second axial ends and being axially spaced from the first and second axial ends to define first and second axially spaced portions, so that the plurality of symmetrical teeth are intermediate the first and second axially spaced portions,*

*each of the teeth has a third axial end that is radially spaced inwards from the outer periphery of the ratchet wheel, with an inclined wall extending between an adjacent one of the first and second axial spaced portions and the third axial end, with the inclined wall having decreasing radial spacing from the adjacent one of the first and second axially spaced portions to the third axial end.*

*25. The ratchet wheel as claimed in claim 8, wherein the angle between the two sides is of 90 degrees, so that said angle portions are each of 45 degrees.*

*26. The ratchet wheel as claimed in claim 25, wherein said two sides of each of the symmetric teeth are of a formation resulting from roll squeezing.*

*27. The ratcheting tool as claimed in claim 15, wherein said angle is of 90 degrees and said two unequal portions are selected from either of 30 and 60 degrees and of 40 and 50 degrees.*

*28. The ratcheting tool as claimed in claim 15, wherein said engaging and biasing means is an elastic member that is disposed in the compartment and is engaged with an end of the pawl.*

*29. The ratchet wheel as claimed in claim 18, wherein the angle between the two sides is of 90 degrees so that the angle portions are each of 45 degrees.*

*30. The ratcheting tool as claimed in claim 18, wherein said engaging and biasing means is an elastic member that is disposed in the compartment and is engaged with an end of the pawl.*

*31. A combination of a ratchet wheel and a pawl in a ratcheting tool of a type in which the pawl is configured to be slidably received in a compartment of the ratcheting tool and to be biased by an elastic member towards a curved wall portion of a wall defining the compartment,*

*the ratchet wheel having an outer periphery and first and second axial ends, the outer periphery including a plurality of teeth each formed into the outer periphery to have a radial depth and be defined by two sides, wherein the plurality of teeth have an axial extent less than an axial extent between the first and second axial ends and are axially spaced from each of the first and second axial ends so that first and second axially spaced portions are defined between each of the first and second axial ends and the teeth, wherein the plurality of teeth are intermediate the first and second axially spaced portions, with each of the two sides including a radially inner linear edge and a radially outer linear edge, with each tooth further defined by a first intersection of the radially inner linear edge of each of the two sides with an adjacent tooth and by a second intersection of the radially outer linear edges of the two sides and which is substantially parallel to the first intersection,*

*the pawl including a plurality of teeth each formed complimentarily to each of the teeth of the ratchet wheel to fill the area between the two facing sides,*

*wherein the two sides include an operative side and the plurality of the teeth of the pawl are engaged by a plurality of operative sides of the plurality of teeth, the pawl further configured to cooperate with the plurality of teeth of the ratchet wheel in said ratcheting tool during ratcheting to be pushed by the plurality of operative sides against said curved wall portion to provide for a reliable engagement of the plurality of teeth of the pawl into the plurality of teeth of the ratchet wheel, and*

*wherein the ratchet wheel includes a center and a radial line from the center through the first intersection divides an angle that is defined between the two sides into two unequal portions, wherein the first intersection is non-arcuate and is radially spaced inwards from the outer periphery of the ratchet wheel, wherein each tooth has a third axial end, with an inclined annular wall extending between the outer periphery of the ratchet wheel and the third axial end, with the inclined annular wall having decreasing radial spacing from the outer periphery of the ratchet wheel to the third axial end.*

*32. The combination as claimed in claim 31, wherein said angle is of 90 degrees and said two unequal portions are selected from either of 30 and 60 degrees and of 40 and 50 degrees.*

*33. The combination as claimed in claim 31, wherein the second intersection is arcuate in shape in a direction parallel to the outer periphery.*

*34. The combination as claimed in claim 32, wherein the second intersection is arcuate in shape in a direction parallel to the outer periphery.*

*35. The combination as claimed in claim 31, wherein the first intersection is non-arcuate.*

*36. The combination as claimed in claim 31, wherein the two sides of each of the teeth of the ratchet wheel are of a formation resulting from roll squeezing.*

*37. The combination as claimed in claim 32, wherein the two sides of each of the teeth of the ratchet wheel are of a formation resulting from roll squeezing.*

*38. The combination as claimed in claim 35, wherein the two sides of each of the teeth of the ratchet wheel are of a formation resulting from roll squeezing.*

* * * * *